(12) United States Patent
Labbe

(10) Patent No.: US 12,296,732 B2
(45) Date of Patent: May 13, 2025

(54) SEAT AND ACCESSORY CONNECTION SYSTEM FOR A VEHICLE

(71) Applicant: BOMBARDIER RECREATIONAL PRODUCTS INC., Valcourt (CA)

(72) Inventor: Christian Labbe, Magog (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 395 days.

(21) Appl. No.: 17/851,137

(22) Filed: Jun. 28, 2022

(65) Prior Publication Data

US 2022/0410770 A1 Dec. 29, 2022

Related U.S. Application Data

(60) Provisional application No. 63/215,775, filed on Jun. 28, 2021.

(51) Int. Cl.
*B60N 2/30* (2006.01)
*B60N 2/90* (2018.01)
*B60R 9/06* (2006.01)

(52) U.S. Cl.
CPC .......... *B60N 2/3097* (2013.01); *B60N 2/933* (2018.02); *B60R 9/06* (2013.01); *B60N 2002/952* (2018.02)

(58) Field of Classification Search
CPC . B60N 2/3097; B60N 2002/952; B60N 2/933
See application file for complete search history.

(56) References Cited

U.S. PATENT DOCUMENTS

| 4,266,703 | A | * | 5/1981 | Litz | B62J 9/27 224/418 |
| 5,160,224 | A | * | 11/1992 | Schwiebert | B61D 45/007 410/82 |
| 6,299,042 | B1 | * | 10/2001 | Smith | B62J 7/04 224/450 |
| 6,796,607 | B2 | * | 9/2004 | Bertrand | B62J 25/08 297/243 |
| 6,983,946 | B2 | * | 1/2006 | Sullivan | B65D 25/2841 220/4.27 |
| 7,165,702 | B1 | * | 1/2007 | Billberg | B60R 9/00 224/281 |
| 7,377,570 | B2 | | 5/2008 | Rondeau et al. | |
| 7,854,460 | B2 | | 12/2010 | Tweet et al. | |
| 9,751,592 | B2 | | 9/2017 | Labbe et al. | |

(Continued)

*Primary Examiner* — Brian D Nash
(74) *Attorney, Agent, or Firm* — BCF LLP

(57) ABSTRACT

A seat and accessory connection system for a vehicle includes: a connection base configured to be connected to the vehicle; a seat configured to be removably connected to the vehicle at a first location on the connection base, the seat comprising at least one first connecting feature; and an accessory configured to be removably and selectively connected to either one of the connection base at the first location and the vehicle at a second location on the vehicle. The accessory has at least one second connecting feature for removably connecting the accessory to the first location and the second location. The connection base has at least one third connecting feature configured to selectively engage the at least one first connecting feature of the seat and the at least one second connecting feature of the accessory to removably connect the seat or the accessory at the first location.

20 Claims, 21 Drawing Sheets

(56) References Cited

U.S. PATENT DOCUMENTS

| | | | |
|---|---|---|---|
| 9,926,104 B2* | 3/2018 | Olarte | B65D 21/0231 |
| 10,227,110 B1* | 3/2019 | Valence | B63H 11/04 |
| 10,391,949 B2 | 8/2019 | Labbe et al. | |
| 10,493,895 B2* | 12/2019 | Lamoureux | F16B 21/02 |
| 10,900,607 B1* | 1/2021 | Newman | F16B 7/00 |
| 11,085,579 B2* | 8/2021 | Carnevali | F16M 13/02 |
| 11,685,473 B2* | 6/2023 | Labbe | B60R 9/06 |
| | | | 224/408 |
| 2005/0051575 A1* | 3/2005 | Durivage | B65D 71/02 |
| | | | 222/143 |
| 2011/0315731 A1* | 12/2011 | Takemura | B60P 7/0815 |
| | | | 224/567 |
| 2012/0045276 A1* | 2/2012 | Carnevali | F16B 7/20 |
| | | | 403/350 |
| 2013/0094920 A1* | 4/2013 | Massicotte | B60P 7/0807 |
| | | | 410/82 |
| 2013/0133964 A1* | 5/2013 | Massicotte | B60P 7/0807 |
| | | | 224/547 |
| 2017/0174145 A1* | 6/2017 | Labbe | B60K 15/03177 |
| 2020/0406730 A1* | 12/2020 | Fournier | B60P 7/0807 |
| 2021/0269112 A1* | 9/2021 | Robillard | B62J 9/30 |
| 2022/0234670 A1* | 7/2022 | Cyr | B62J 9/30 |
| 2022/0410770 A1* | 12/2022 | Labbe | B60N 2/3097 |
| 2023/0242041 A1* | 8/2023 | Rousseau | B60R 5/00 |
| | | | 296/37.1 |
| 2024/0174164 A1* | 5/2024 | Vachon | B60P 7/0807 |
| 2024/0278733 A1* | 8/2024 | Tardif | B60R 11/0241 |

\* cited by examiner

SEAT AND ACCESSORY CONNECTION SYSTEM FOR A VEHICLE

CROSS-REFERENCE

The present application claims priority from U.S. Provisional Patent Application No. 63/215,775, filed on Jun. 28, 2021, the entirety of which is incorporated by reference herein.

TECHNICAL FIELD

The present technology relates to accessory connection systems for vehicles.

BACKGROUND

Various types of vehicles can be equipped with accessories to improve the vehicles' functionality. For instance, in some cases, a snowmobile which typically has a single seat provided for the driver can be optionally equipped with a detachable passenger seat that is secured to the snowmobile behind the driver's seat to accommodate a passenger behind the driver. Other types of accessories, such as a storage container, may alternatively be detachably connected to the snowmobile. However, a snowmobile often lacks the space for connecting multiple accessories at the same time. For instance, the snowmobile's configuration, including the size and position of a fuel tank thereof, can complicate the placement of the accessories on the snowmobile.

Therefore, there is a need for a seat and accessory connection system that addresses at least some of these drawbacks.

SUMMARY

It is an object of the present technology to ameliorate at least some of the inconveniences present in the prior art.

In accordance with an aspect of the present technology, there is provided a seat and accessory connection system. The seat and accessory connection kit comprises: a connection base configured to be connected to the vehicle; a seat configured to be removably connected to the vehicle at a first location on the connection base, the seat comprising at least one first connecting feature; and an accessory configured to be removably and selectively connected to either one of: the connection base at the first location, and the vehicle at a second location on the vehicle, the accessory comprising at least one second connecting feature for removably connecting the accessory to the first location and the second location, the connection base having at least one third connecting feature configured to selectively engage the at least one first connecting feature of the seat and the at least one second connecting feature of the accessory to removably connect the seat or the accessory at the first location.

In some embodiments, the seat and accessory connection system also comprises at least one fourth connecting feature configured to be connected to the vehicle at the second location on the vehicle, the at least one fourth connecting feature being configured to engage the at least one second connecting feature of the accessory to removably connect the accessory at the second location on the vehicle.

In some embodiments, the at least one first connecting feature of the seat comprises: a first seat anchor; and a second seat anchor spaced apart from the first seat anchor. The at least one second connecting feature of the accessory comprises: an accessory anchor; and an accessory tongue spaced apart from the accessory anchor. The at least one third connecting feature of the connection base comprises: a first anchor fixture configured to selectively receive the first seat anchor and the accessory anchor; and a second anchor fixture configured to selectively receive the second seat anchor and the accessory tongue.

In some embodiments, each of the first seat anchor, the second seat anchor and the accessory anchor is actuatable for selective locking thereof to a corresponding one of the first and second anchor fixtures.

In some embodiments, each of the first seat anchor, the second seat anchor and the accessory anchor has a rotatable lever for selective locking thereof to the corresponding one of the first and second anchor fixtures.

In some embodiments, wherein the connection base comprises: an upper portion comprising the at least one third connecting feature; and a left leg and a right leg extending downward from the upper portion, the left leg and the right leg being laterally spaced apart from one another, the left leg and the right leg being configured to be connected to the vehicle.

In some embodiments, the upper portion comprises a platform, the at least one third connecting feature being connected to the platform.

In some embodiments, each of the left leg and the right leg has an upper end portion and a lower end portion, the lower end portion being configured to be connected to the vehicle.

In some embodiments, the left leg is a front left leg; the right leg is a front right leg; and the connection base further comprises a rear left leg and a rear right leg extending downward from the upper portion, the rear left leg and the rear right leg being configured to be connected to the vehicle.

In some embodiments, the seat comprises at least one hook extending from a bottom surface of the seat; and the upper portion defines at least one slot configured to receive the at least one hook.

In some embodiments, the seat is a passenger seat configured to be disposed behind a driver seat of the vehicle.

In some embodiments, the accessory is a storage container.

In some embodiments, a vehicle comprises: a frame; a driver seat supported by the frame; a plurality of ground-engaging members operatively connected to the frame; a motor operatively connected to at least one of the ground-engaging members to drive the vehicle; the seat and accessory connection system, the connection base being connected to the frame, the seat being removably connected to the connection base via the at least one first connecting feature, the accessory being removably connected at the second location on the vehicle via the at least one second connecting feature.

In some embodiments, the seat and accessory connection system further comprises at least one fourth connecting feature connected to the frame, the at least one fourth connecting feature engaging the at least one second connecting feature of the accessory to removably connect the accessory at the second location on the vehicle.

In some embodiments, the first location is behind the driver seat; the seat is a rear passenger seat; and the rear passenger seat and the accessory are removably connectable to the connection base behind the driver seat.

In some embodiments, the second location is behind the first location.

In some embodiments, the vehicle further comprises: a power storage compartment for powering the motor; and the connection base is connected to the frame such that at least part of the connection base extends vertically above the power storage compartment.

In some embodiments, the connection base comprises: an upper portion comprising the at least one third connecting feature; and a left leg and a right leg extending downward from the upper portion, the left leg and the right leg being laterally spaced apart from one another, the left leg and the right leg being connected to the frame, the left leg and the right leg straddling the power storage compartment such that the upper portion extends vertically above the power storage compartment.

In some embodiments, the driver seat has an upper surface for seating a driver of the vehicle; and the upper portion of the connection base is disposed vertically lower than the upper surface of the driver seat.

In some embodiments, the at least one second connecting feature of the accessory is positioned vertically lower than the upper portion of the connection base.

In some embodiments, the motor is an internal combustion engine and the power storage compartment comprises a fuel tank.

In some embodiments, the vehicle is a snowmobile; the frame comprises a tunnel; and the connection base is connected to the tunnel.

According to another aspect of the present technology, there is provided a vehicle. The vehicle comprises: a frame; a driver seat supported by the frame; a plurality of ground-engaging members operatively connected to the frame; a motor operatively connected to at least one of the ground-engaging members to drive the vehicle; a power storage compartment for powering the motor; a connection base connected to the frame, the connection base comprising: an upper portion extending at least in part above the power storage compartment, the upper portion comprising at least one connecting feature for removably connecting an accessory to the vehicle; and a left leg and a right leg extending downward from the upper portion, the left leg and the right leg straddling the power storage compartment, each of the left leg and the right leg having a lower end portion connected to the frame.

In some embodiments, the motor is an internal combustion engine and the power storage compartment comprises a fuel tank.

In some embodiments, the power storage compartment further comprises a battery.

In some embodiments, the upper portion of the connection base extends at least in part above the battery.

In some embodiments, the connection base is positioned behind the driver seat.

In some embodiments, the left leg is on a first side of a longitudinal centerplane of the vehicle and the right leg is on a second side of the longitudinal centerplane of the vehicle.

In some embodiments, the left leg is a front left leg; the right leg is a front right leg; and the connection base further comprises a rear left leg and a rear right leg extending downward from the upper portion, each of the rear left leg and the rear right leg having a lower end portion connected to the frame.

In some embodiments, the vehicle is a snowmobile; the frame comprises a tunnel; and the left leg and the right leg are connected to the tunnel.

In some embodiments, the at least one connecting feature comprises a first anchor fixture and a second anchor fixture laterally spaced apart from the first anchor fixture; and each of the first anchor fixture and the second anchor fixture defines an anchor opening for receiving therethrough a respective anchor of the accessory.

In some embodiments, the upper portion comprises a platform, the first anchor fixture and the second anchor fixture being connected to the platform.

In some embodiments, the accessory is one of a passenger seat and a storage container.

According to another aspect of the present technology, there is provided a seat and accessory connection kit for a vehicle. The kit comprises: a connection base configured to be connected to the vehicle; a seat configured to be removably connected to the vehicle at a first location on the connection base, the seat comprising at least one first connecting feature; and an accessory configured to be removably and selectively connected to either one of: the connection base at the first location, and the vehicle at a second location on the vehicle, the accessory comprising at least one second connecting feature for removably connecting the accessory to the first location and the second location, the connection base having at least one third connecting feature configured to selectively engage the at least one first connecting feature of the seat and the at least one second connecting feature of the accessory to removably connect the seat or the accessory at the first location.

In some embodiments, the kit further comprises at least one fourth connecting feature configured to be connected to the vehicle at the second location on the vehicle, the at least one fourth connecting feature being configured to engage the at least one second connecting feature of the accessory to removably connect the accessory at the second location on the vehicle.

In some embodiments, the at least one first connecting feature of the seat comprises: a first seat anchor; and a second seat anchor spaced apart from the first seat anchor. The at least one second connecting feature of the accessory comprises: an accessory anchor; and an accessory tongue spaced apart from the accessory anchor. The at least one third connecting feature of the connection base comprises: a first anchor fixture configured to selectively receive the first seat anchor and the accessory anchor; and a second anchor fixture configured to selectively receive the second seat anchor and the accessory tongue.

In some embodiments, each of the first seat anchor, the second seat anchor and the accessory anchor is actuatable for selective locking thereof to a corresponding one of the first and second anchor fixtures.

In some embodiments, each of the first seat anchor, the second seat anchor and the accessory anchor has a rotatable lever for selective locking thereof to the corresponding one of the first and second anchor fixtures.

In some embodiments, the connection base comprises: an upper portion comprising the at least one third connecting feature; and a left leg and a right leg extending downward from the upper portion, the left leg and the right leg being laterally spaced apart from one another, the left leg and the right leg being configured to be connected to the vehicle.

In some embodiments, the upper portion comprises a platform, the at least one third connecting feature being connected to the platform.

In some embodiments, each of the left leg and the right leg has an upper end portion and a lower end portion, the lower end portion being configured to be connected to the vehicle.

In some embodiments, the left leg is a front left leg; the right leg is a front right leg; and the connection base further comprises a rear left leg and a rear right leg extending downward from the upper portion, the rear left leg and the rear right leg being configured to be connected to the vehicle.

In some embodiments, the seat comprises at least one hook extending from a bottom surface of the seat; and the upper portion defines at least one slot configured to receive the at least one hook.

In some embodiments, the seat is a passenger seat configured to be disposed behind a driver seat of the vehicle.

In some embodiments, the accessory is a storage container.

For purposes of this application, terms related to spatial orientation when referring to the vehicle orientation and positioning of its components such as forwardly, rearwardly, left, and right are as they would normally be understood by a driver of the vehicle sitting thereon in a normal riding position.

Embodiments of the present technology each have at least one of the above-mentioned aspects, but do not necessarily have all of them.

It is to be understood that if there are any discrepancies between definitions in the present application and in documents incorporated by reference herein, definitions in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
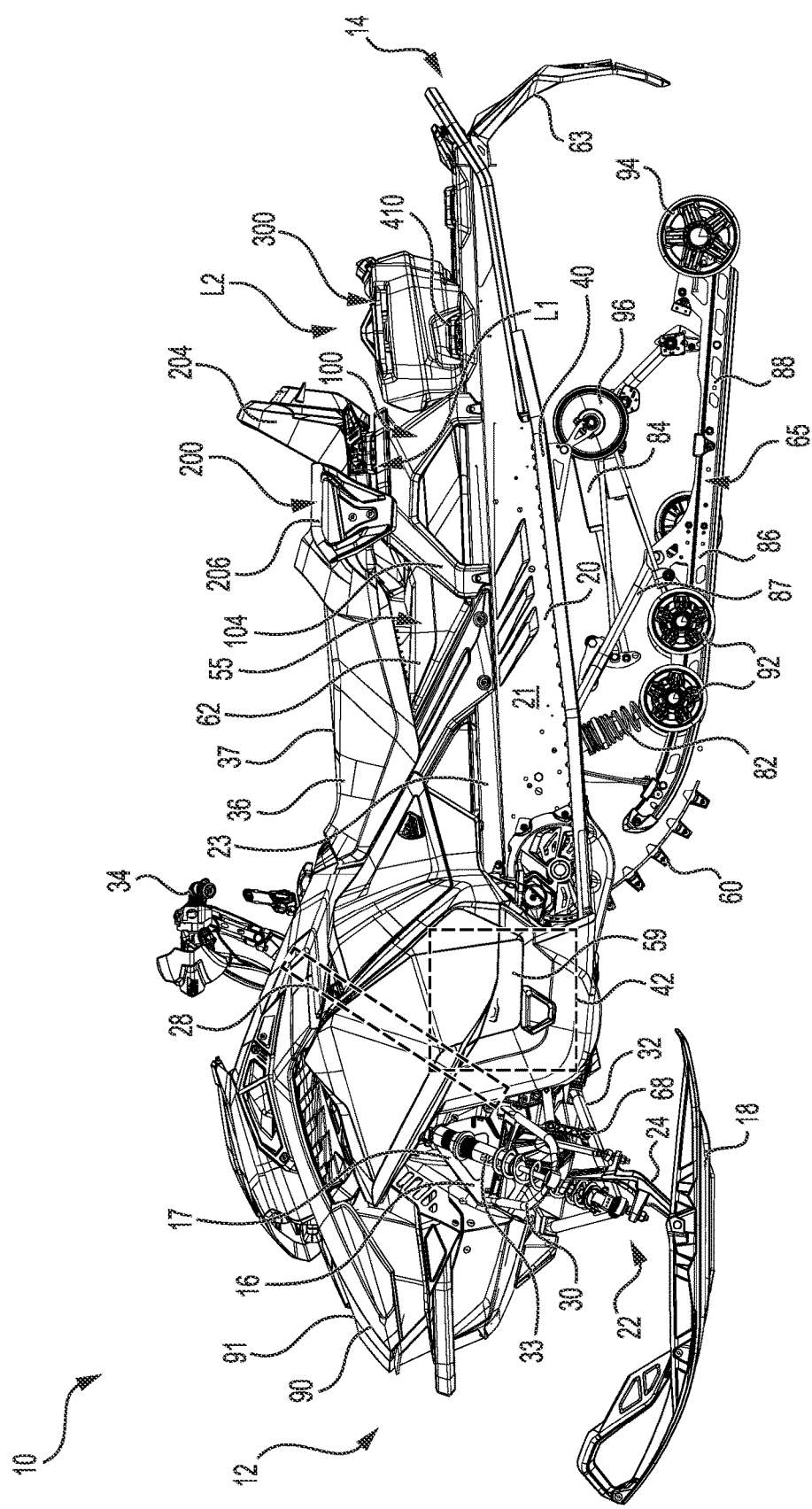
FIG. 1 is a left side elevation view of a snowmobile according to an embodiment of the present technology.

With reference to FIG. 1, a vehicle 10 in accordance with an embodiment of the present technology will be described herein. As will be described in greater detail below, the vehicle 10 is provided with two accessories 200, 300 which can be removably connected to the vehicle 10 via a connection base 100. In this embodiment, the vehicle 10 is a snowmobile 10 designed for travel over snow. However, it is understood that the snowmobile 10 may instead be any other suitable vehicle, such as other types of off-road vehicles (e.g., all-terrain vehicles (ATVs), side-by-side vehicles (SSVs)) as well as road vehicles.

Figure 4:
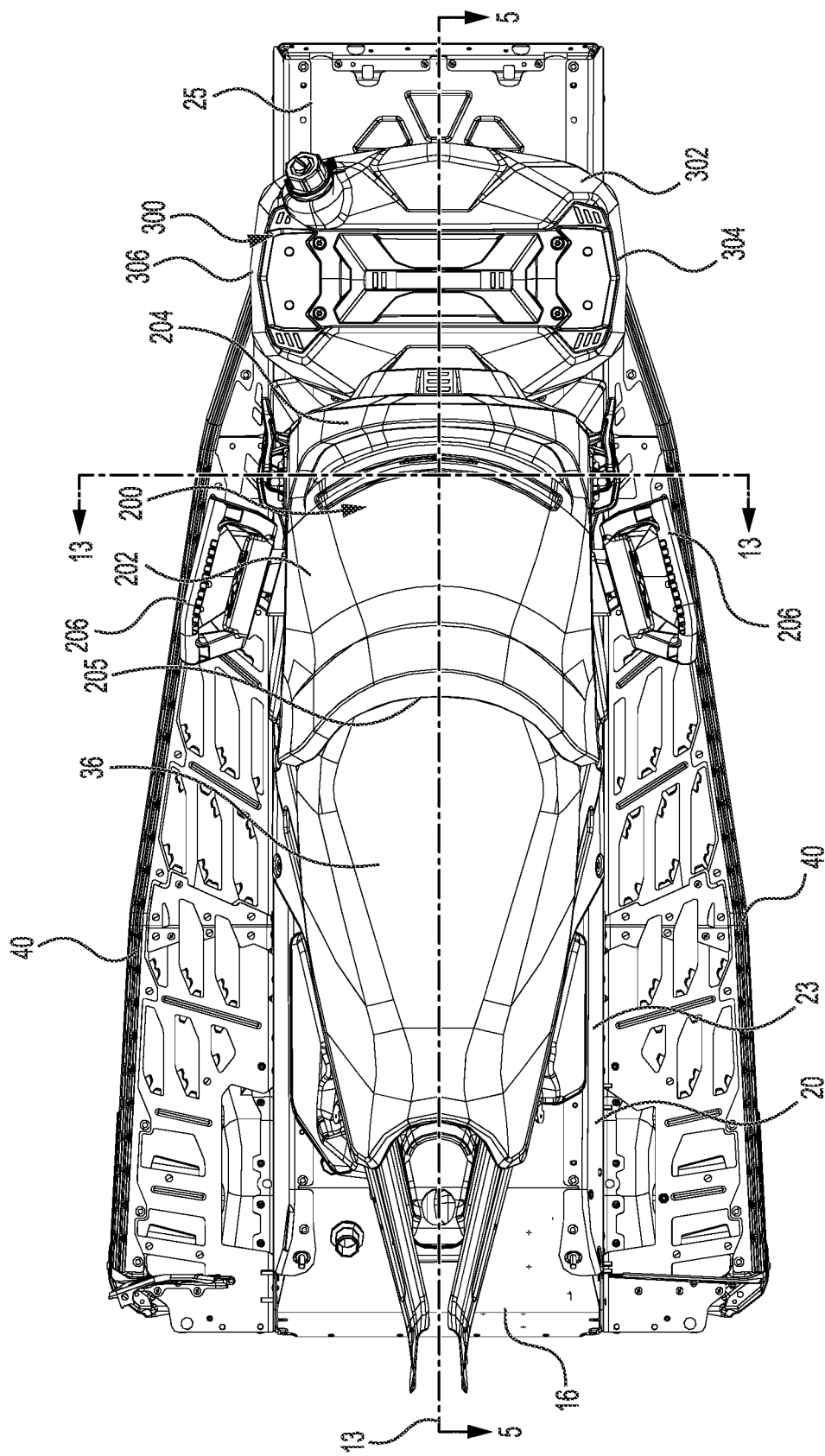
FIG. 4 is a top plan view of the part of the snowmobile of FIG. 2.

As shown in FIG. 1, the snowmobile 10 has a front end 12 and a rear end 14, which are defined consistently with the forward travel direction of the snowmobile 10. The snowmobile 10 has a frame 16, including a tunnel 20, for supporting the various components of the snowmobile 10. The tunnel 20 has left and right side surfaces 21 that extend generally longitudinally and face generally leftward and rightward respectively. In this embodiment, the left and right side surfaces 21 are parallel to a vertical plane, such as a longitudinal centerplane 13 of the snowmobile 10 (FIG. 4). The left and right side surfaces 21 could be disposed at other angles relative to a vertical plane in other embodiments. The tunnel 20 also has left and right beveled surfaces 23 that extend between a top surface 25 (FIG. 2) of the tunnel 20 and the left and right side surfaces 21. The beveled surfaces 23 could be omitted in other embodiments such that the left and right side surfaces 21 extend to the top surface 25.

The snowmobile 10 has a ski and steering assembly including left and right skis 18 positioned at the front end 12 of the snowmobile 10 and connected to a front portion 17 of the frame 16 through left and right front suspension assemblies 22. Left and right ski legs 24, also referred to as spindles, are connected to the left and right skis 18 respectively and extend upwardly therefrom. The ski legs 24 are also operatively connected to a steering column 28 (shown schematically in FIG. 1) via a respective steering link 68. At its upper end, the steering column 28 is connected to a handlebar 34 which is positioned forward of a driver of the snowmobile 10 to rotate the ski legs 24 and thus the skis 18, in order to steer the snowmobile 10.

Each of the front suspension assemblies 22 operatively connects a corresponding one of the ski legs 24 to the frame 16. In this embodiment, the left front suspension assembly 22 is a mirror image of the right front suspension assembly 22 and therefore only the right front suspension assembly 22 will be described herein. It is to be understood that the same description applies to the left front suspension assembly 22. In this embodiment, the front suspension assembly 22 includes two supporting arms 30, 32 connected between the front portion 17 of the frame 16 and the corresponding ski leg 24. A shock absorber 33 is connected between the frame 16 and one of the supporting arms 30, 32 to dampen shocks to which the snowmobile 10 is subjected during use. In this embodiment, the supporting arms 30, 32 of the front suspension assembly 22 include an upper A-arm 30 and a lower A-arm 32 disposed vertically lower than the upper A-arm 30. The shock absorber 33 is connected between the lower A-arm 32 and the front portion 17 of the frame 16.

It is contemplated that the front suspension assemblies 22 could be different from the double A-arm suspensions described above.

A driver straddle seat 36 is disposed rearward of the handlebar 34 and is supported by the frame 16. The driver seat 36 has an upper surface 37 on which the driver of the snowmobile 10 is seated. As best shown in FIG. 4, left and right footrests 40 extend along opposite lateral sides of the tunnel 20 vertically lower than the driver seat 36 to accommodate the driver's and, if applicable, the passenger's feet. As will be described in greater detail below, a passenger seat 200 is configured to be selectively connected to the snowmobile 10 behind the driver seat 36 to accommodate a passenger behind the driver.

Figure 2:
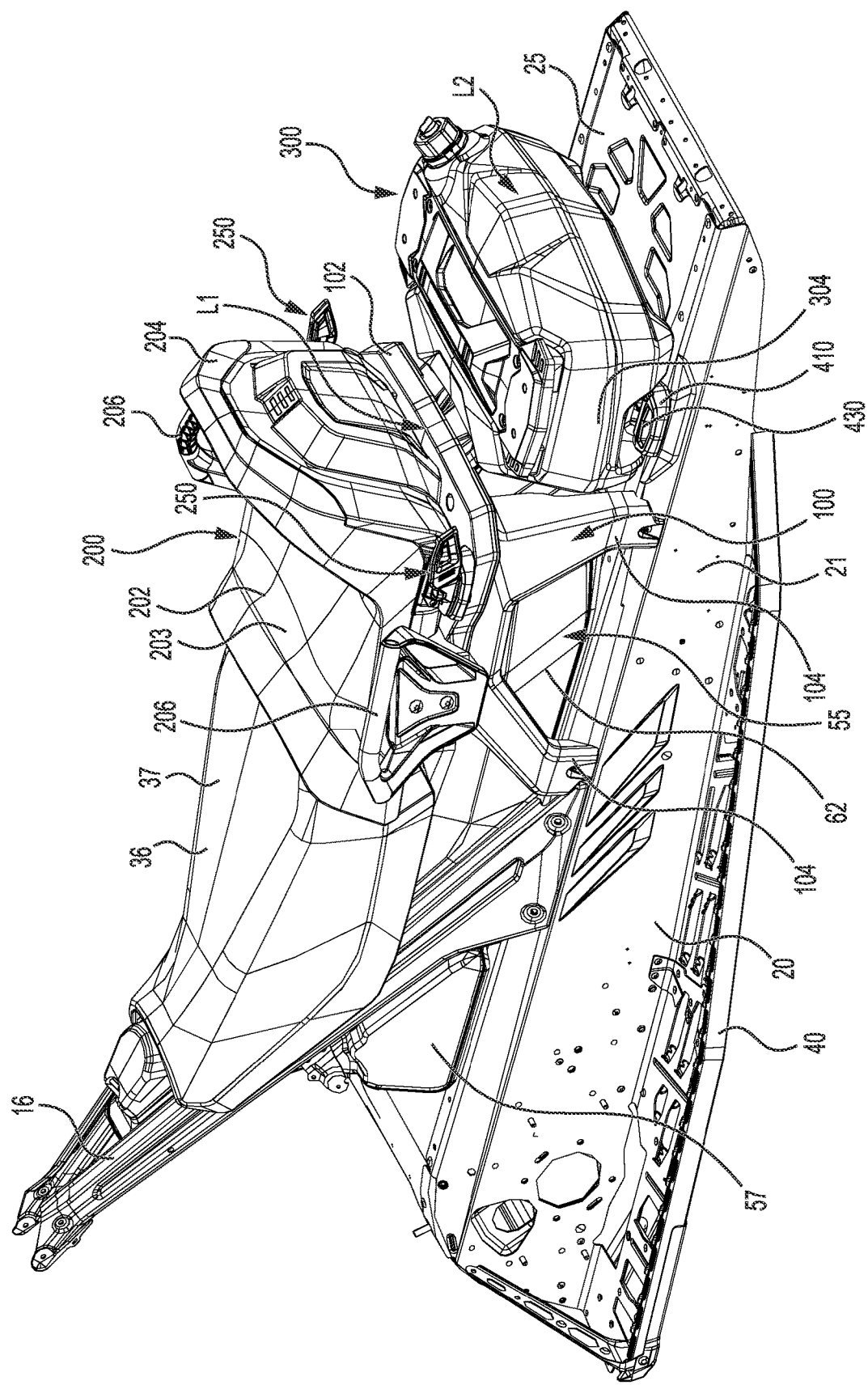
FIG. 2 is a perspective view, taken from a top, rear, left side, of part of the snowmobile of FIG. 1, including a seat and accessory connection system thereof.
Figure 6:
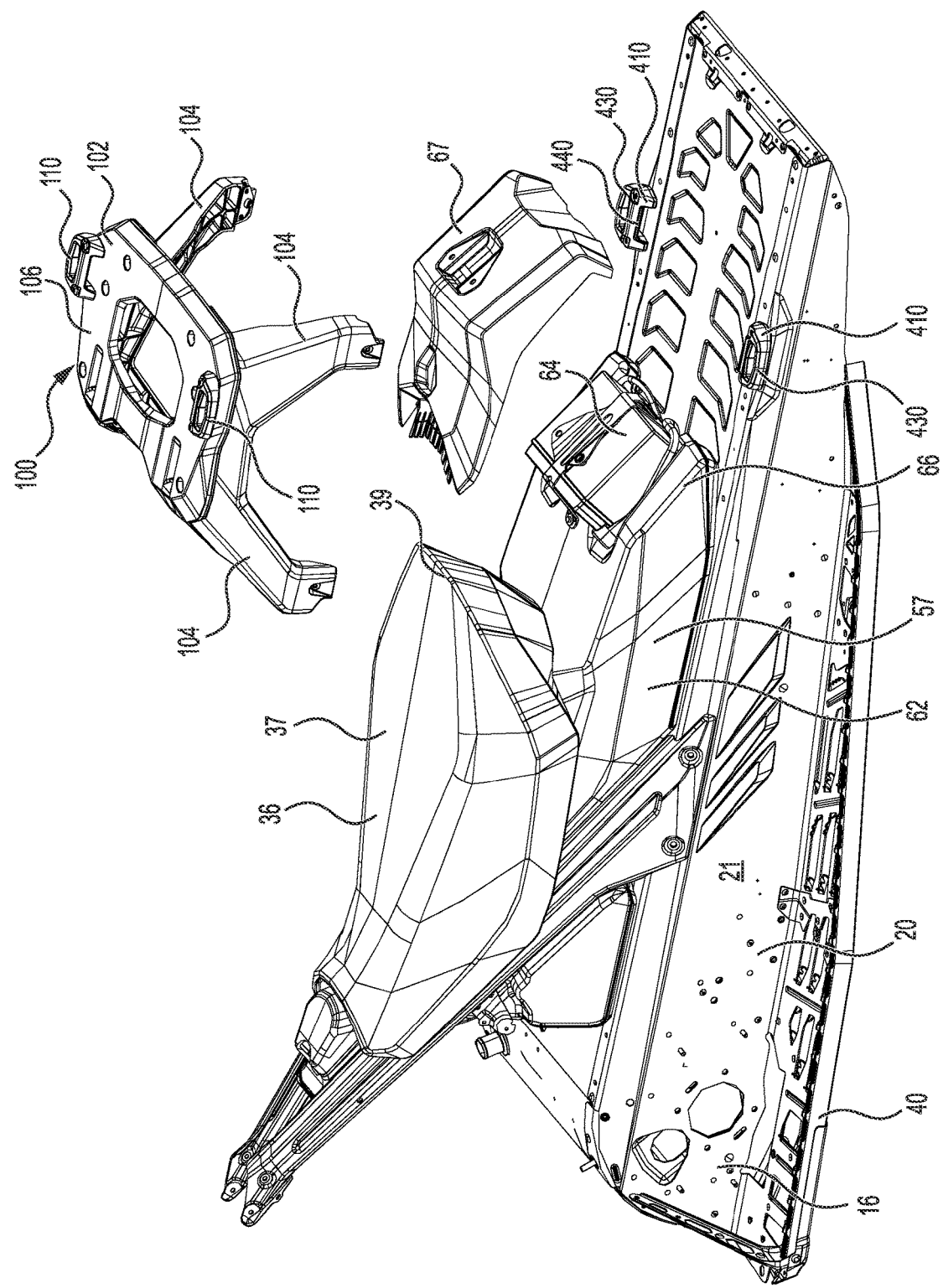
FIG. 6 is a perspective view, taken from a top, rear, left side, of the part of the snowmobile of FIG. 2, with a seat and a storage container removed and showing a connection base and a battery cover of the snowmobile disconnected therefrom.

A motor 42 (illustrated schematically in FIG. 1) is supported by a motor compartment defined by the frame 16 and provides, in part, propulsion of the snowmobile 10. In this embodiment, the motor 42 is an internal combustion engine operating on a two-stroke engine cycle. However, it is contemplated that the motor 42 could be a four-stroke engine cycle, an electric motor or a hybrid in other embodiments. As shown in FIGS. 1 and 2, a power storage compartment 55 for powering operation of the engine 42 is disposed above the tunnel 20 and in part below the driver seat 36. In this embodiment, the power storage compartment 55 includes a fuel tank 57 for storing fuel that is supplied to the engine 42 for combustion. The fuel tank 57 has a left end 62 (FIG. 6) and a right end (not shown) which define a width of the fuel tank 57 therebetween. In this embodiment, the left end 62 and the right end of the fuel tank 57 are disposed laterally inwardly of the left and right side surfaces 21 of the tunnel 20. As best shown in FIG. 6, in this embodiment, the power storage compartment 55 also includes a battery 64 that is connected to and disposed behind the fuel tank 57. Notably, the battery 64 is connected to a rear end of the fuel tank 57, and is covered by a battery cover 67. In embodiments in which the motor 42 is an electric motor, the power storage compartment 55 could solely comprise one or more batteries.

An endless drive track 60 (only a portion of which is shown) is positioned generally under the tunnel 18 and is operatively connected to the engine 42 via a drivetrain including a belt transmission system (not shown). The drive track 60 is driven to run about a rear suspension assembly 65 for propulsion of the snowmobile 10. The drive track 60 is engaged with and driven by two drive sprockets (not shown) which are journaled by the tunnel 20 and driven by the engine 42 through the belt transmission system.

The rear suspension assembly 65 is disposed beneath the tunnel 20 and is connected thereto. The rear suspension assembly 65 has front and rear shock absorbers 82, 84. The front shock absorber 82 extends rearwardly and downwardly from a front portion of the tunnel 20, and is disposed between the tunnel 20 and a slide frame assembly 86 of the rear suspension assembly 65, partially forward of front suspension arms 87 of the rear suspension assembly 65. The rear shock absorber 84 extends forwardly and downwardly from a rear portion of the tunnel 20, and is disposed at least in part rearwardly of the front suspension arms 87. The slide frame assembly 86 includes a pair of spaced apart slide rails 88 that engage the inner side of the ground-engaging portion of the drive track 60. The slide frame assembly 86 journals a plurality of backup rollers 92 and a larger idler roller 94. In addition, further rollers 96 are carried by the tunnel 20, in order to define the path over which the endless track 60 travels. Other types of rear suspension assemblies are contemplated.

A snow flap 63 is connected to a rear end of the tunnel 20 to protect against snow and dirt that could be projected from the drive track 60 when driving. It is contemplated that the snow flap 63 could be omitted.

Returning to FIG. 1, at the front end 12 of the snowmobile 10, fairings 90 are provided that enclose internal components of the snowmobile 10 such as the engine 42, thereby providing an external shell that not only protects these components of the snowmobile 10, but also makes the snowmobile 10 more aesthetically pleasing. The fairings 90 include a hood 91 and side body panels 59. The fairings 90 may be opened to allow access to the engine 42 and other transmission components when required, for example for inspection or maintenance thereof.

The snowmobile 10 includes other elements well known in the art, and as such they will not be described in detail herein.

A system that allows the accessories 200, 300 to be removably connected to the snowmobile 10 will now be described in greater detail. In this embodiment, the accessories 200, 300 include a seat 200 and a storage container 300. It is contemplated that the storage container 300 could be any other suitable type of accessory. As such, the system may be referred to generally as a seat and accessory connection system. The seat and accessory connection system notably includes the seat 200, the storage container 300 and the connection base 100. In particular, as will be described in detail, the connection base 100 is connected to the snowmobile 10 to allow the seat 200 and the storage container 300 to be selectively and removably connected thereto.

Figure 8:
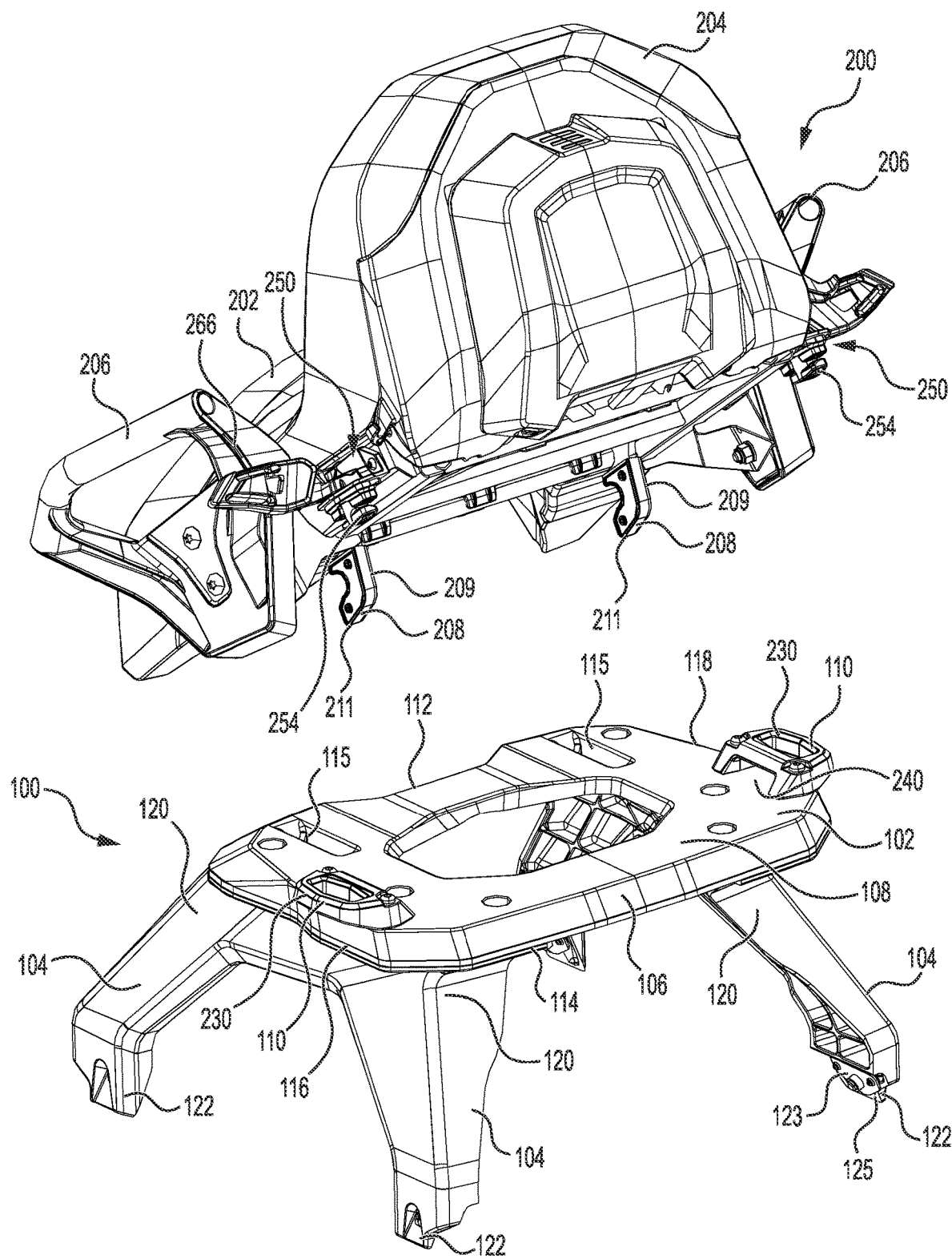
FIG. 8 is a perspective view, taken from a top, rear, left side, of the seat and the connection base shown in an exploded configuration.

As best shown in FIG. 8, in this embodiment, the connection base 100 has an upper portion 102 and four legs 104 extending downward from the upper portion 102. The upper portion 102 includes a platform 106 that is generally planar and has an upper surface 108 which, when the connection base 100 is connected to the snowmobile 10, faces upwardly. The platform 106 has a front end 112 and a rear end 114, as well as a left end 116 and a right end 118. The upper surface 108 defines two slots 115 which extend generally longitudinally (i.e., in a direction from the front end 112 to the rear end 114). The two slots 115 are disposed near the front end 112 of the platform 106.

Figure 3:
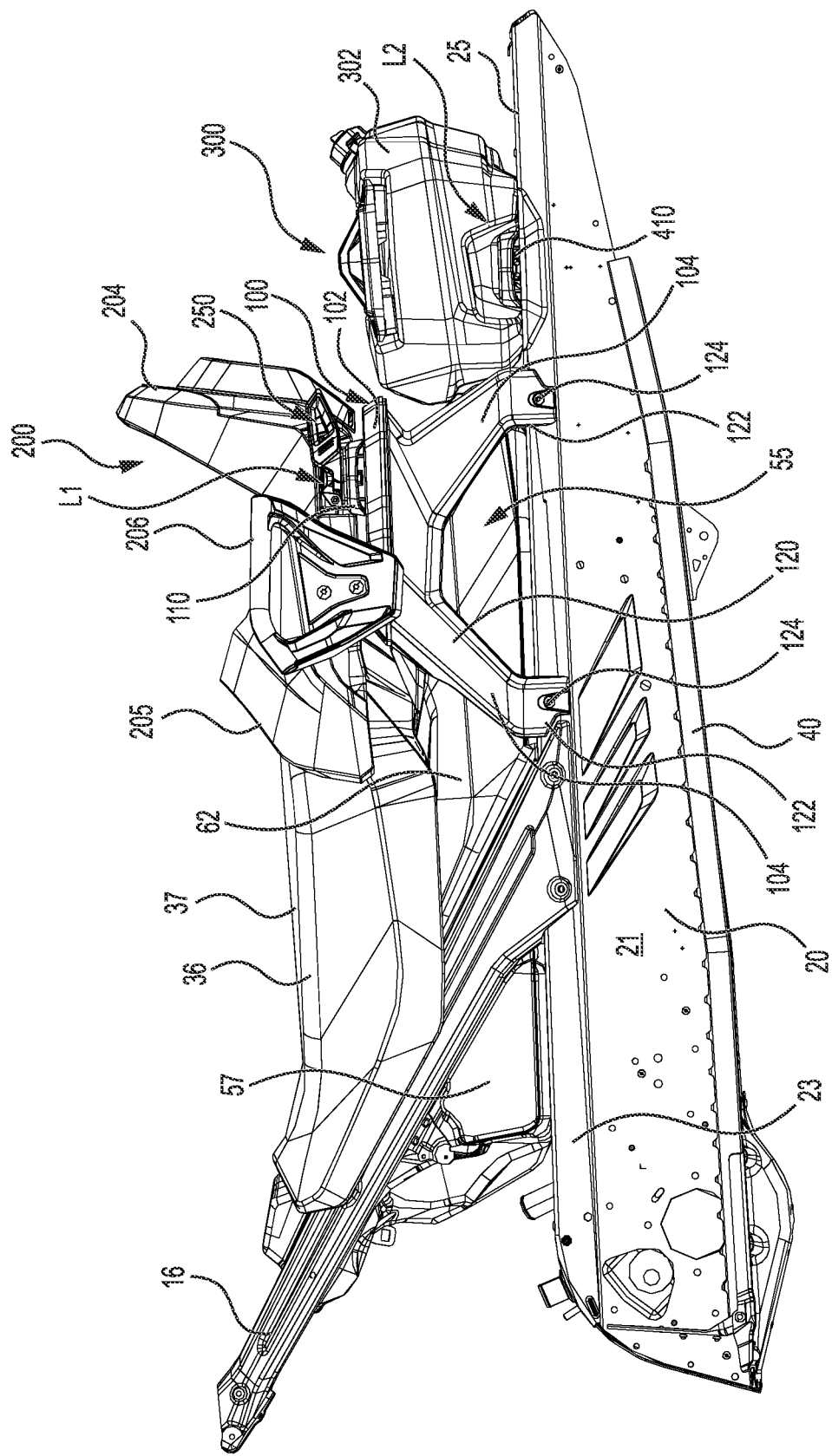
FIG. 3 is a left side elevation view of the part of the snowmobile of FIG. 2.
Figure 5:
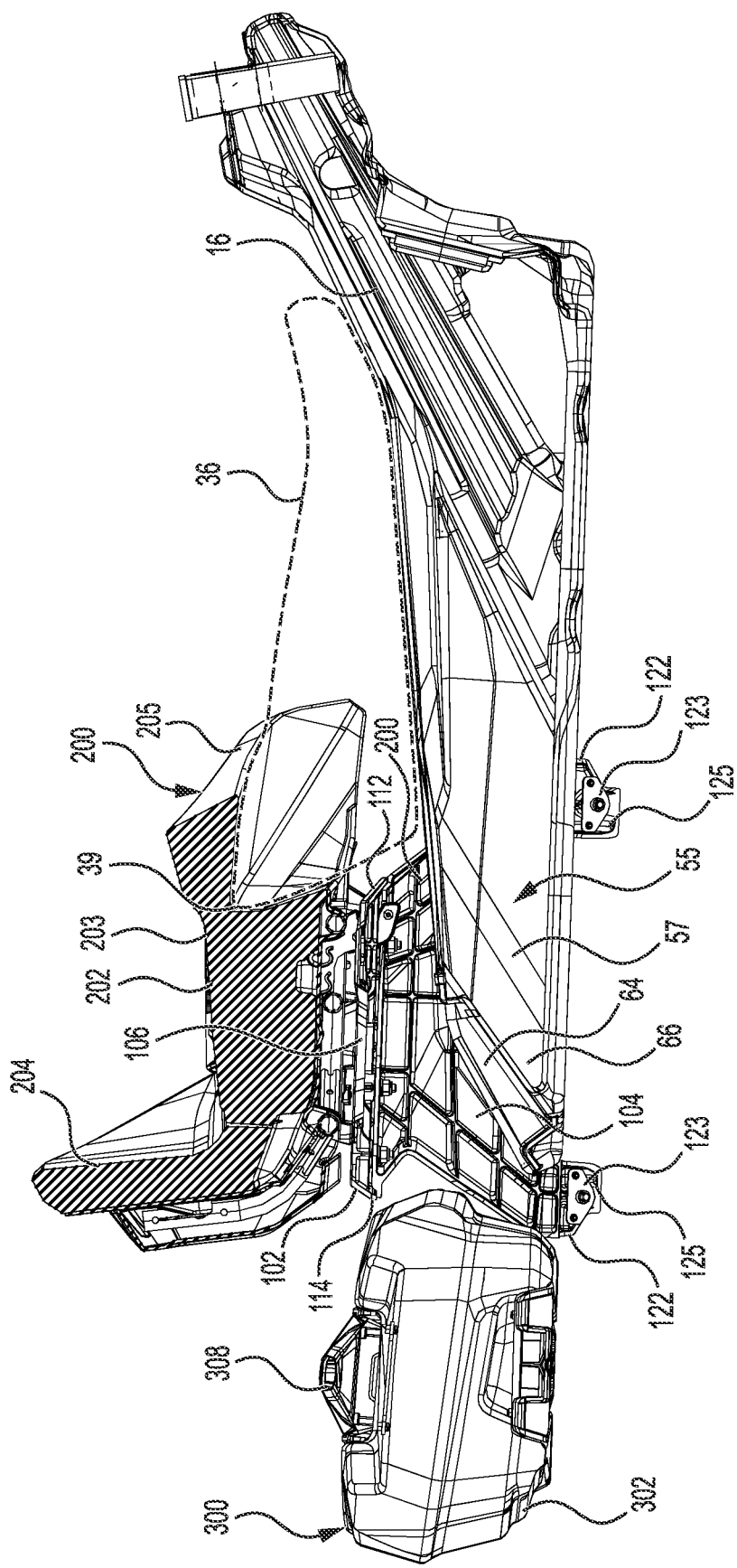
FIG. 5 is a cross-sectional view of the part of the snowmobile of FIG. 2 taken along line 5-5 in FIG. 4, with a tunnel of the snowmobile removed for clarity.
Figure 13:
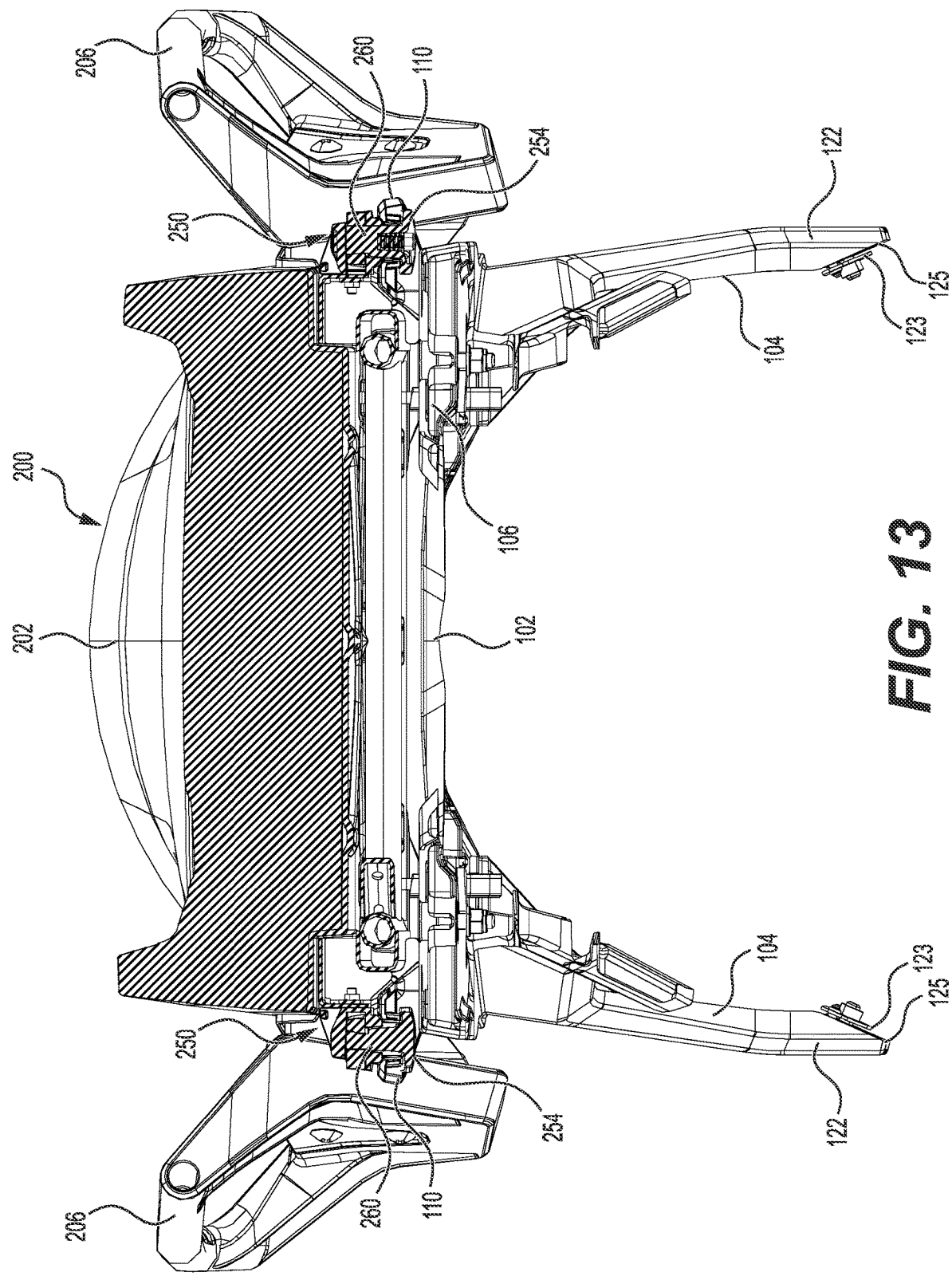
FIG. 13 is a cross-sectional view of the seat and the connection base taken along line 13-13 in FIG. 4.

With continued reference to FIG. 8, the four legs 104 of the connection base 100 include front left, front right, rear left and rear right legs 104. The left legs 104 are laterally spaced apart from the right legs 104. Each of the legs 104 has an upper end portion 120 and a lower end portion 122. As will be described below, the lower end portions 122 of the legs 104 are connected to the frame 16. The front left and front right legs 104 extend downward and forward from their upper end portions 120 to their lower end portions 122. The rear left and rear right legs 104 extend downward and rearward from their upper end portions 120 to their lower end portions 122. As shown in FIGS. 5, 8 and 13, the lower end portion 122 of each of the legs 104 has an inner sloped surface 125. In order to connect the connection base 100 to the frame 16 of the snowmobile 10, the sloped surface 125 of each of the legs 104 is mated with a corresponding one of the left and right beveled surfaces 23 of the tunnel 20. As shown in FIG. 3, a fastener 124 (e.g., a bolt) extends through the lower end portion 122 of a respective one of the legs 104 and through a corresponding one of the left and right beveled surfaces 23 to fasten the connection base 100 to the tunnel 20. In particular, with reference to FIGS. 5, 8 and 13, inner brackets 123 are disposed on an inner side of the tunnel 20, aligned with the beveled surfaces 23, to threadedly receive respective ones of the fasteners 124 and to reinforce the tunnel 20 at the locations of the inner brackets 123.

Figure 7:
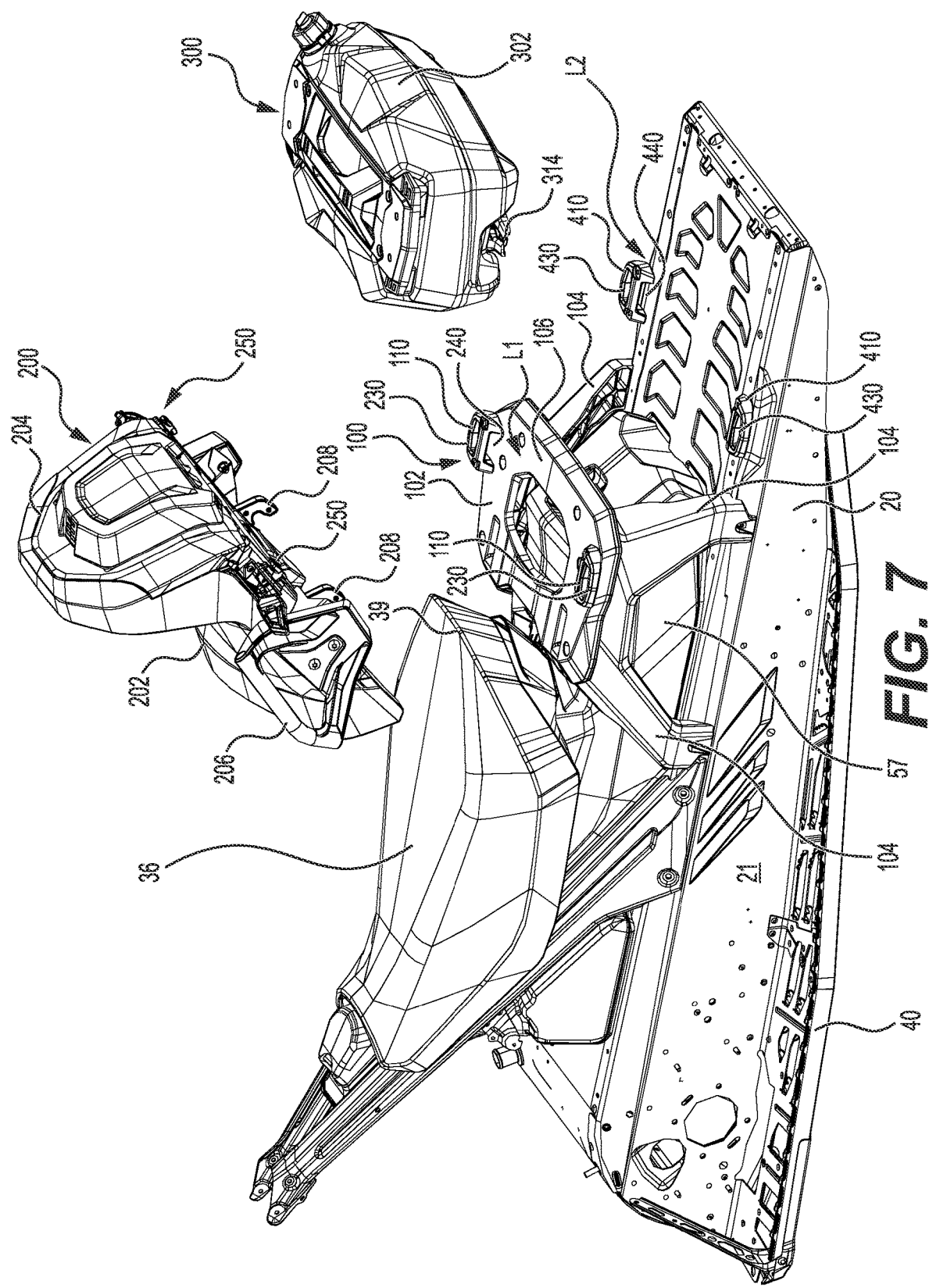
FIG. 7 is a perspective view, taken from a top, rear, left side, of the part of the snowmobile of FIG. 2, showing a seat and a storage container of the seat and accessory connection system disconnected from the snowmobile.

As shown in FIGS. 3, 5 and 7, when the connection base 100 is connected to the tunnel 20, the connection base 100 is positioned behind the driver seat 36, with the upper portion 102 of the connection base 100 being disposed vertically lower than the upper surface 37 of the driver seat 36. In particular, the left legs 104 and the right legs 104 of the connection base 100 straddle the power storage compartment 55, with the left legs 104 being disposed on a left side of the longitudinal centerplane 13 and the right legs 104 being disposed on a right side of the longitudinal centerplane 13. As such, the upper portion 102 of the connection base 100 extends vertically above the power storage compartment 55. It is to be understood that the expression "vertically above" as used herein to describe a first component being vertically above a second component refers to the first component being vertically higher than the second component and being at least partially longitudinally and laterally aligned with the second component. As shown in FIG. 5, when the connection base 100 is connected to the tunnel 20, the upper portion 102 is disposed vertically above the rear end 66 of the fuel tank 57 and the battery 64. For instance, the front end 112 of the platform 106 is disposed vertically above the fuel tank 57, with the rear end 66 of the fuel tank 57 being disposed rearward of the front end 112. The rear end 114 of the platform 106 is disposed rearward of the battery 64 and of the rear end 66 of the fuel tank 57. As such, the configuration of the connection base 100 is adapted to accommodate the size and position of the fuel tank 57, thereby allowing the connection of the accessories 200, 300 at a location that would otherwise be unavailable.

The connection base 100 has base connecting features 110 which, as will be described in greater detail below, are configured to engage corresponding connecting features of the seat 200 and the storage container 300. In this embodiment, the base connecting features 110 include two base connecting features, namely left and right base connecting features 110. In this embodiment, the base connecting features 110 are anchor fixtures 110 that are connected to the platform 106, on the upper surface 108 thereof. The left anchor fixture 110 is disposed near the left end 116, and the right anchor fixture 110 is disposed near the right end 118. In this embodiment, the left and right anchor fixtures 110 are identical to one another.

Figure 9:
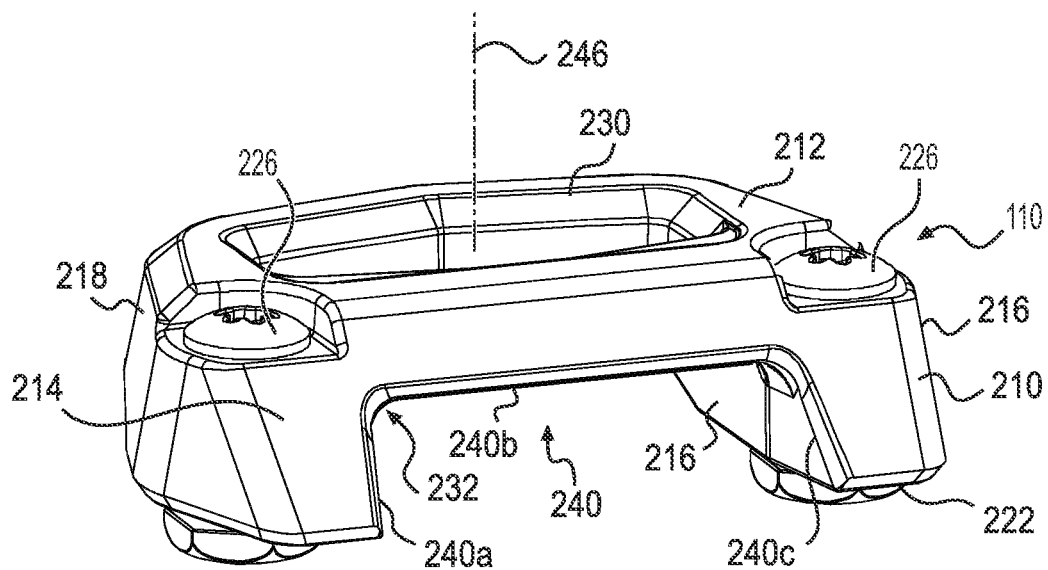
FIG. 9 is a perspective view, taken from a rear, right side, of a left anchor fixture of the connection base of FIG. 8.
Figure 10:
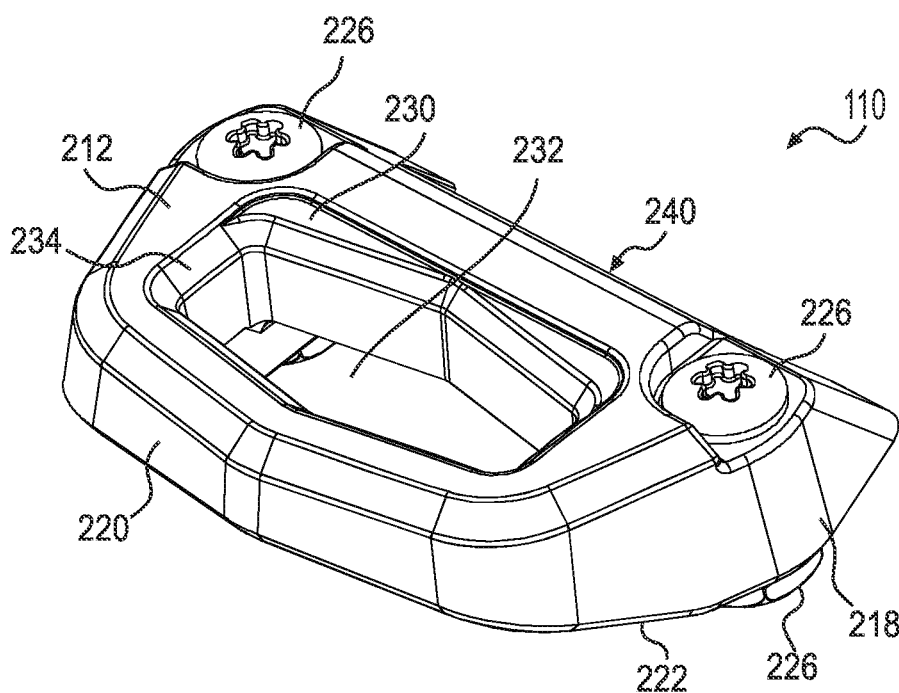
FIG. 10 is a perspective view, taken from a top, rear, left side, of the left anchor fixture of FIG. 9.
Figure 11:
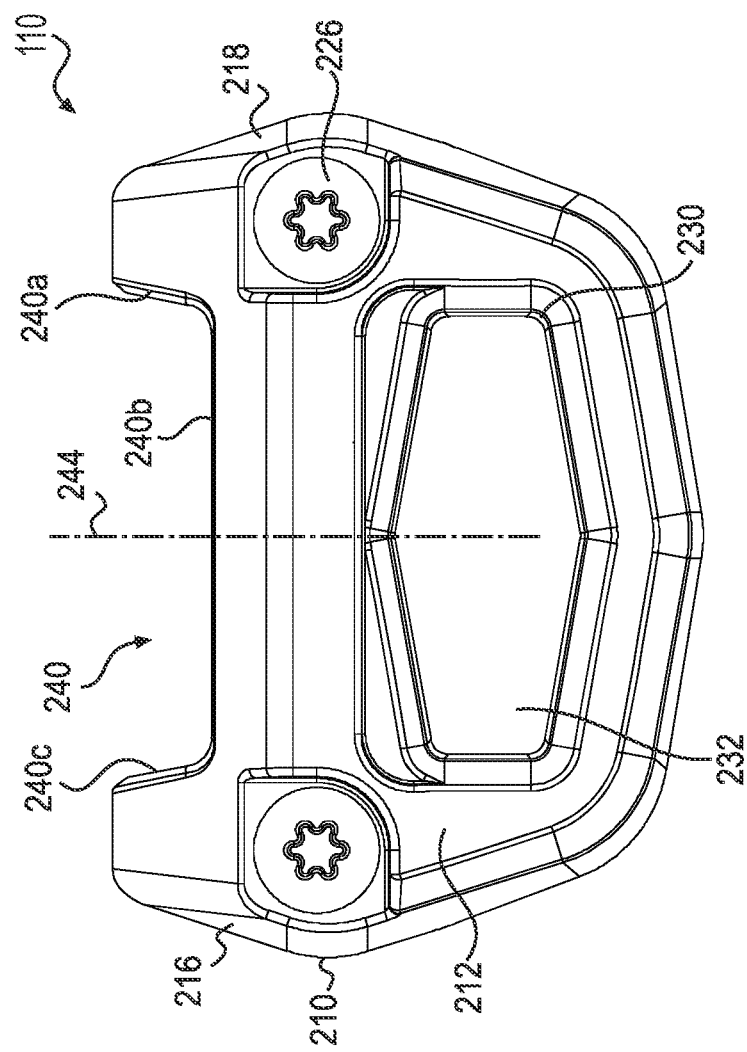
FIG. 11 is a top plan view of the left anchor fixture of FIG. 9.

With reference to FIGS. 8 to 10, each anchor fixture 110 has a fixture body 210 having a top portion 212, a front portion 214, a left side portion 216, a right side portion 218 and rear portion 220, each portion having an interior and an exterior surface. The fixture body 210 also has a base 222. A pair of fasteners 226 inserted through a pair of fastener holes (not shown) in the fixture body 210 are used to secure the anchor fixture 200 into fastener holes (not shown) defined by the upper surface 108 of the connection base 100. An anchor aperture 230 is defined by the top portion 212 of the fixture body 210. The anchor aperture 230 leads downwards through the top portion 212 to an anchor chamber 232 defined by the interior surfaces of the portions 212, 216, 218, 220. The anchor chamber 232, below the anchor aperture 230, extends outwards towards the front portion 214. The front portion 214 defines a fastener aperture 240 that leads into the anchor chamber 232. The fastener aperture 240 in the front surface is generally rectangular and defined by three edges 240a, 240b, 240c of the front surface 214 of the fixture body 210. In this embodiment, the fourth edge of the fastener aperture 240 is defined by the surface on which the anchor fixture 110 is disposed, namely the upper surface 108 of the platform 106. It is contemplated that the fastener aperture 240 can be defined wholly by the fixture body 210 or by the fixture body 210 and any other surfaces that the anchor fixture 110 may be engaged with. A more complete description of the anchor fixtures 110 can be found in U.S. Pat. No. 9,751,592, issued Sep. 5, 2017, the entirety of which is incorporated by reference herein.

As shown in FIGS. 7 and 8, in this embodiment, the left and right anchor fixtures 110 of the connection base 100 are positioned on the platform 106 such that the fastener apertures 240 face one another. As will be described in greater detail below, part of a corresponding connecting feature of the seat 200 or the storage container 300 can be inserted into the anchor aperture 230 to secure the seat 200 or the storage container 300 to the anchor fixture 110. Moreover, part of a corresponding connecting feature of the storage container 300 can be inserted into the fastener aperture 240 to secure the storage container 300 to the anchor fixture 110.

While in this embodiment the left and right anchor fixtures 110 are identical to one another, it is contemplated that the left and right anchor fixtures 110 could be configured differently from one another in other embodiments. For instance, in some embodiments, the left anchor fixture 110 could define the anchor aperture 230 while omitting the fastener aperture 240, and the right anchor fixture 110 could define the fastener aperture 240 while omitting the anchor aperture 230, or vice-versa.

Returning now to FIGS. 2 to 4, the seat 200 has a seating portion 202 having an upper surface 203 which, when the seat 200 is connected to the snowmobile 10, faces upwardly. A backrest 204 extends upward from the seating portion 202 for supporting a passenger's back. The seat 200 also has left and right handles 206 which are disposed on either side of the seating portion 202. The handles 206 serve as hand holds for a passenger seated on the seat 200. As best shown in FIG. 8, on a bottom side of seating portion 202 of the seat 200, the seat 200 has two hooks 208 which extend from a bottom surface of the seat 200. Each hook 208 is generally L-shaped and has a first portion 209 and a second portion 211 extending at angle from one another. Notably, the first portion 209 extends downward from the bottom surface of the seat 200 while the second portion 211 extends generally forward and downward from a bottom end of the first portion 209.

With continued reference to FIG. 8, the seat 200 has two connecting features 250 that are selectively engaged with the anchor fixtures 110 of the connection base 100. In particular, in this embodiment, the connecting features 250 are left and right anchors 250 that are connected to the seating portion 202 of the seat 200 and are disposed laterally outward therefrom. That is, the left anchor 250 is connected to the left side of the seating portion 202 while the right anchor 250 is connected to the right side of the seating portion 202. The left and right anchors 250 are disposed proximate the rear end of the seating portion 202. In this embodiment, the left and right anchors 250 are identical to one another.

Figure 12:
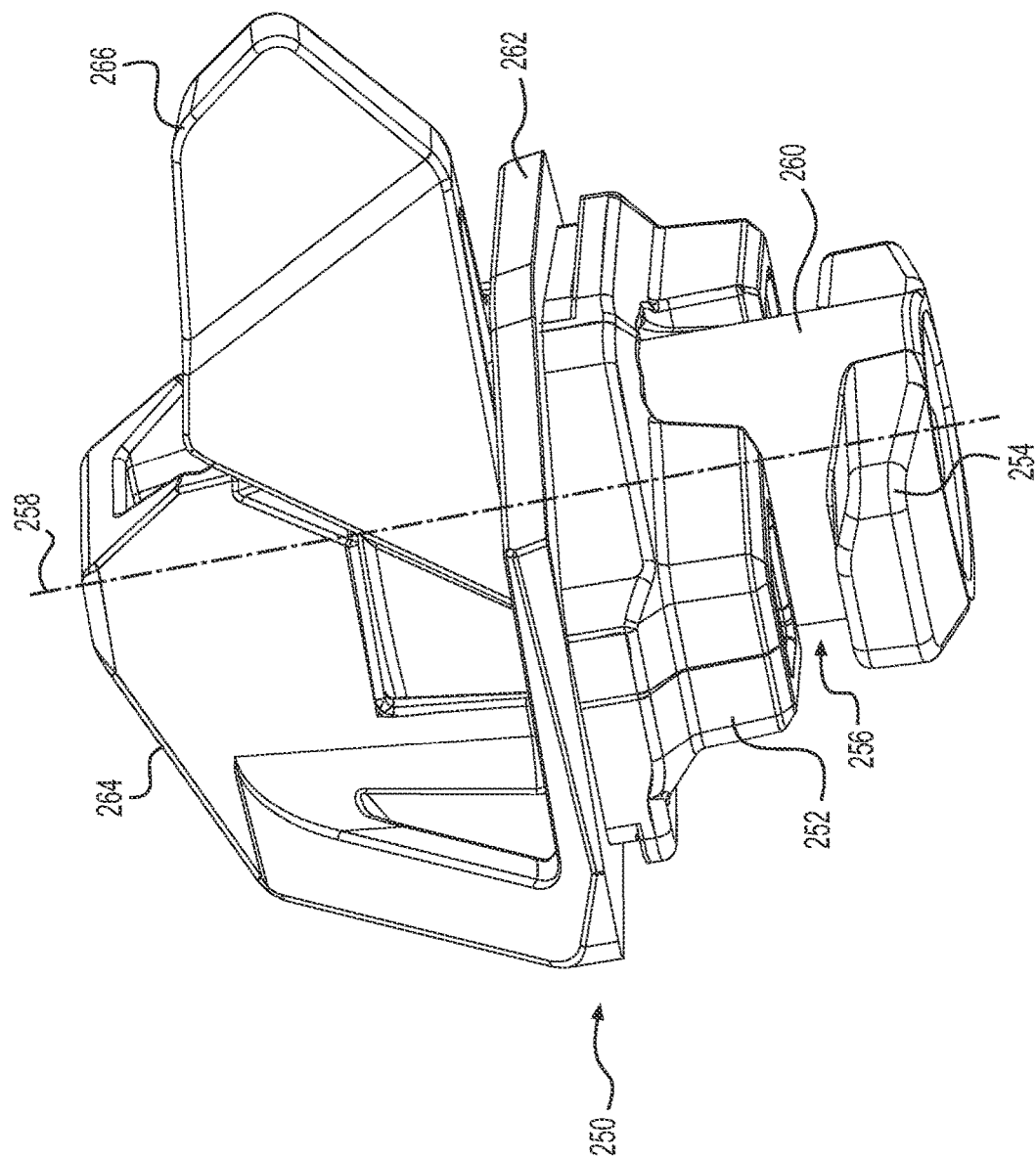
FIG. 12 is a perspective view, taken from a rear, left side, of a left anchor of the seat of FIG. 8.

As shown in FIG. 12, each anchor 250 has an anchor base 252 and an anchor lock 254 extending below the anchor base 252, spaced therefrom by a gap 256. The anchor base 252 has a horizontal portion 262 and an upright portion 264 generally perpendicular to the horizontal portion 262. The upright portion 264 is connected to the corresponding side of the seating portion 202 of the seat 200. In this embodiment, each of the horizontal portion 262 and the anchor lock 254 has an elongated shape. The anchor lock 254 is connected to the anchor base 252 via a stem 260 defining an axis 258. A lever 266 is connected to the stem 260, above the horizontal portion 262. The lever 266 allows a user to rotate the stem 260 about the axis 258, thereby rotating the anchor lock 254. In particular, the anchor lock 254 is rotatable about the axis 258 between locked and unlocked positions. In the unlocked position, which is illustrated in FIG. 12, the anchor lock 254 extends generally parallel to the anchor base 252. In the locked position, the anchor lock 254 is rotated by 90° about the axis 258 relative to the unlocked position. A more complete description of the anchor locks 250 can be found in U.S. Pat. No. 9,751,592.

Returning now to FIG. 8, the seat 200 can be removably connected to the connection base 100 by inserting the hooks 208 into the slots 115 of the connection base 100 and tilting the seat 200 down and rearward so that the anchor locks 254 of the anchors 250, in their unlocked positions, are received through the anchor apertures 230 of the corresponding anchor fixtures 110. As will be understood, the anchor apertures 230 are shaped to allow the anchor locks 254 to be inserted or removed therefrom when the anchor locks 254 are in the unlocked position. With the anchor locks 254 received in the anchor chambers 232 of the anchor fixtures 110, the rotatable levers 266 of the anchors 250 are then rotated to place the anchor locks 254 in their locked positions, thereby selectively locking the anchors 250 to the corresponding anchor fixtures 110 as shown in FIG. 13. Notably, in the locked position, each anchor lock 254 is not removable from the corresponding anchor fixture 110. As such, the seat 200 can be removably connected at a location L1 on the connection base 100. As will be appreciated, in this position of the seat 200, the second portions 211 of the hooks 208 are disposed underneath the front end 112 of the platform 106 such that a front portion of the seat 200 is secured in place by the hooks 208. Moreover, with reference to FIG. 5, when the seat 200 is disposed at the location L1 on the connection base 100, a portion of the seat 200, namely a front end portion thereof, extends vertically above a rear end 39 of the driver seat 36. As such, the front end portion of the seat 200 is longitudinally aligned with the rear end 39 of the driver seat 36, with a front end 205 of the seat 200 being disposed forward of the rear end 39 of the driver seat 36.

In order to remove the seat 200 from the snowmobile 10, the anchor lock 254 of each anchor 250 is rotated back to the unlocked position and the anchors 250 are disengaged from the anchor fixtures 110 by removing each anchor lock 254 from the corresponding anchor chamber 232 through the anchor aperture 230. The seat 200 is then lifted so that the hooks 208 are removed from the slots 115. As will be appreciated, the seat 200 can therefore be easily and quickly installed on the snowmobile 10, notably as the seat 200 can even be secured toollessly (e.g., without using a screwdriver or other implement).

It is contemplated that, in other embodiments, the anchors 250 of the seat 200 and the anchor fixtures 110 of the connection base 100 could be different types of connecting features. For instance, in other embodiments, the anchor 250 and the anchor fixtures 110 could be replaced by different types of connecting features which are engageable with one another and may be operated differently than the arrangement of the anchors 250 and anchor fixtures 110. In such embodiments, the hooks 208 of the seat 200 could still be maintained for retaining the front portion of the seat 200 to the connection base 100.

Figure 14:
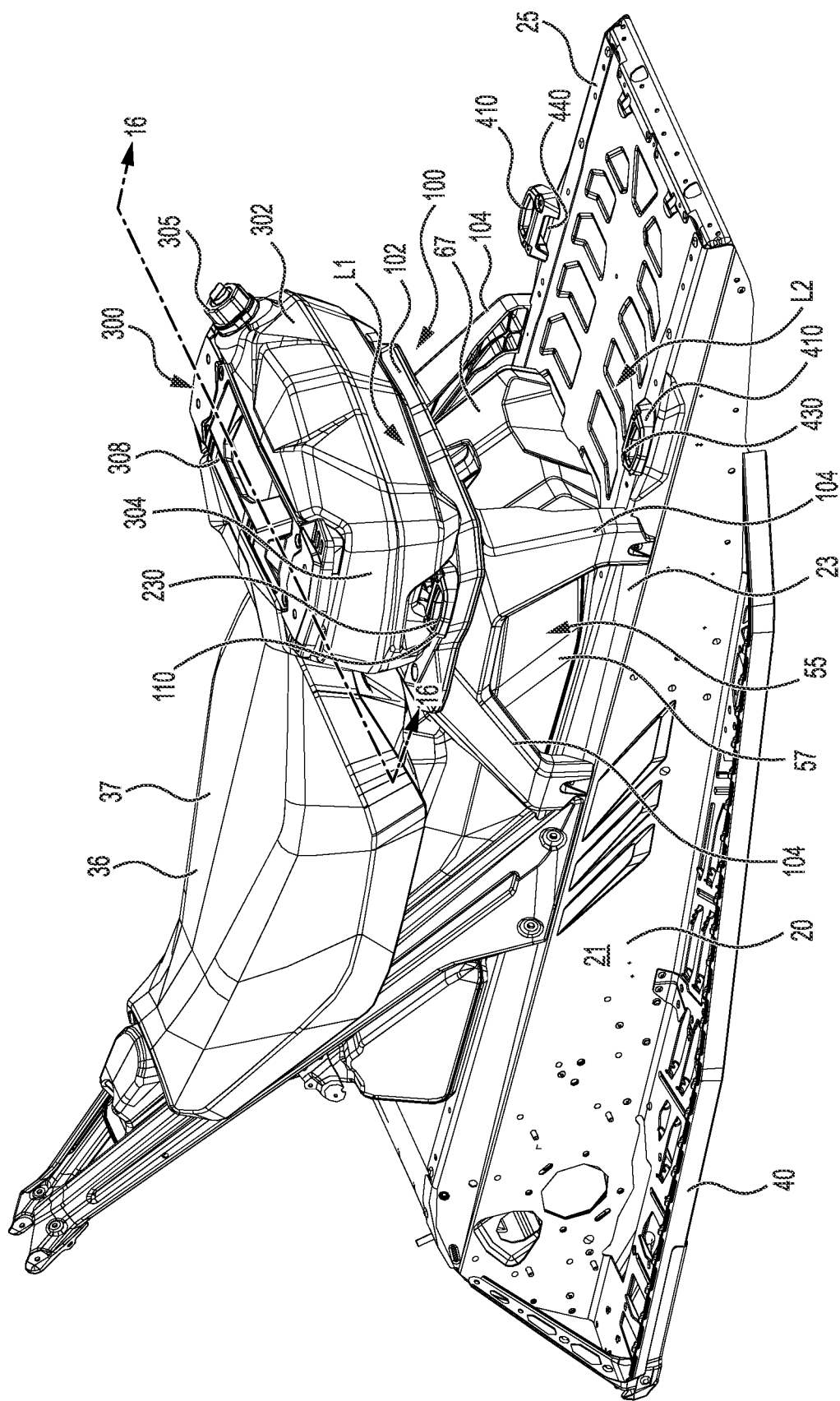
FIG. 14 is a perspective view, taken from a top, rear, left side, of the part of the snowmobile of FIG. 2, with the seat being removed therefrom and the storage container removably connected to the connection base.
Figure 15:
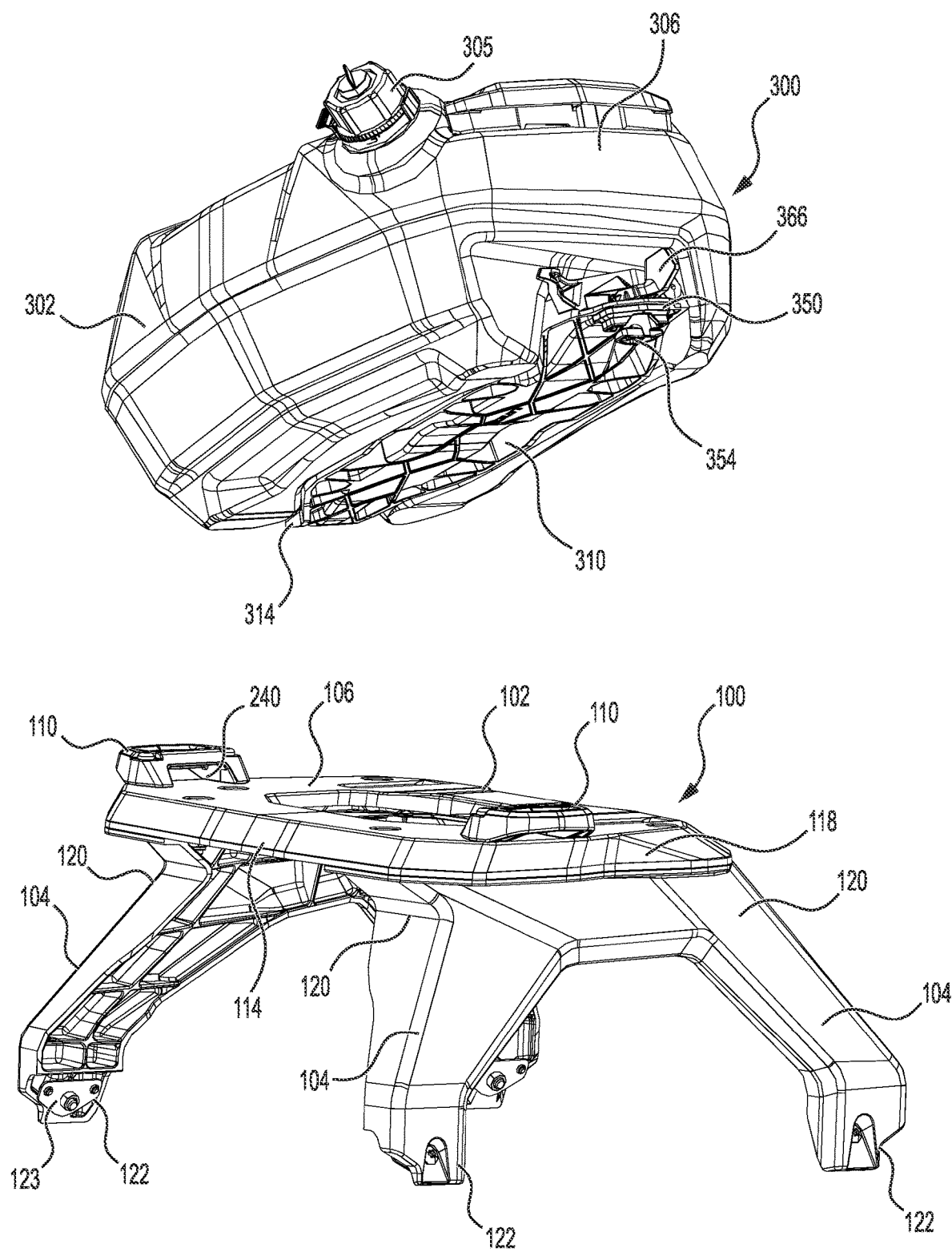
FIG. 15 is a perspective view, taken from a top, rear, right side, of the connection base and the storage container as the storage container is being removably connected to the connection base.

As shown in FIGS. 13 to 15, the storage container 300 can also be removably connected to the connection base 100 at the location L1. For instance, when the passenger seat 200 is not required, the user can instead decide to secure the storage container 300 on the connection base 100. The seat 200 and the storage container 300 are thus interchangeably connectable to the connection base 100.

With reference to FIGS. 2 to 4, the storage container 300 has a container body 302 having a left end 304 and a right end 306. In this embodiment, the storage container 300 is a fuel container (sometimes referred to as a "jerrycan") configured to store fuel therein. As such, in this embodiment, the storage container 300 has a cap 305 to selectively close off an opening through which fuel is poured out of or poured into the container body 302. The storage container 300 also has a handle 308 on an upper side thereof. It is contemplated that, in other embodiments, the storage container 300 could be a container for storing items therein.

Figure 16:
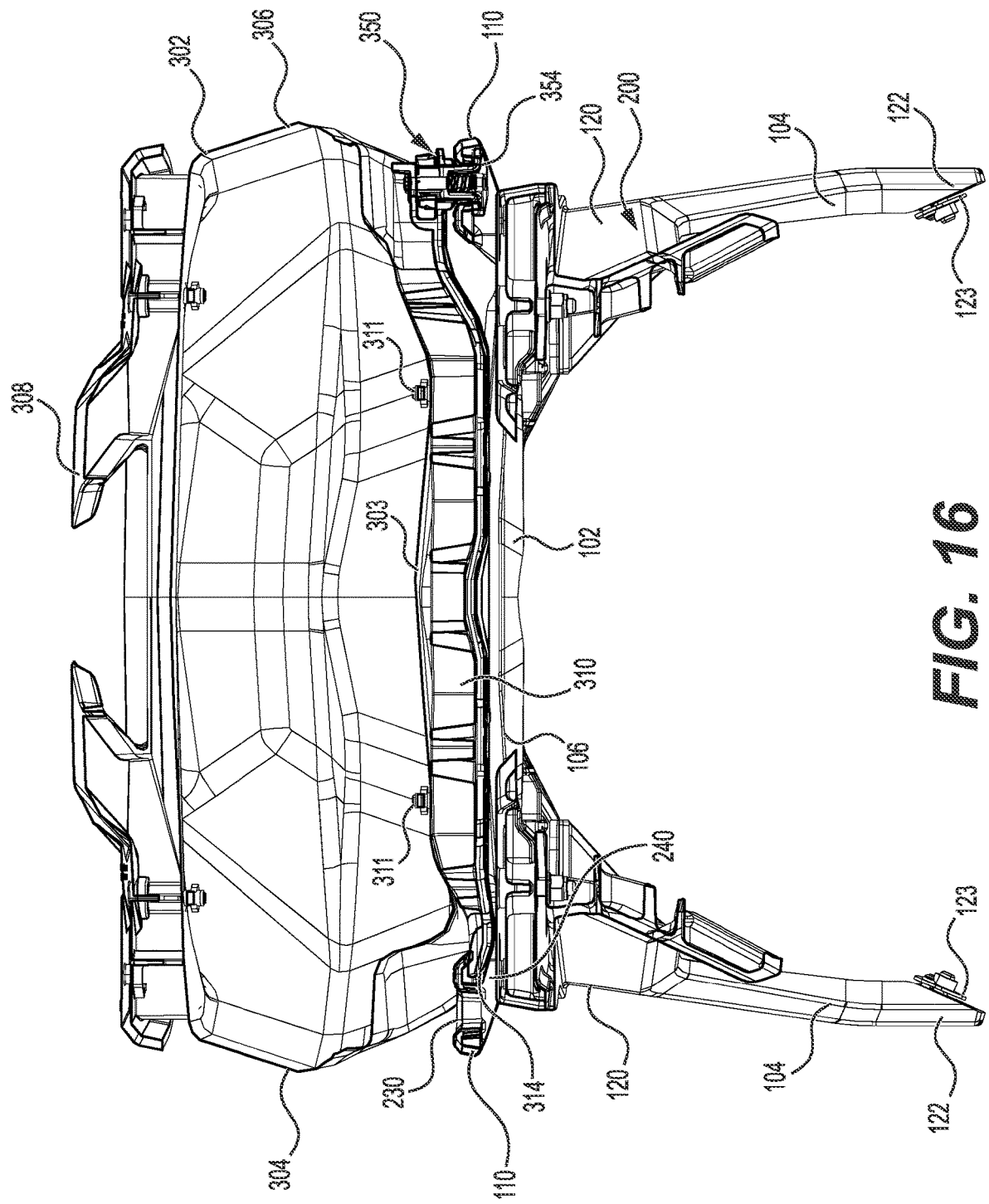
FIG. 16 is a cross-sectional view of the storage container and the connection base of FIG. 14 taken along line 16-16 in FIG. 14.
Figure 17:
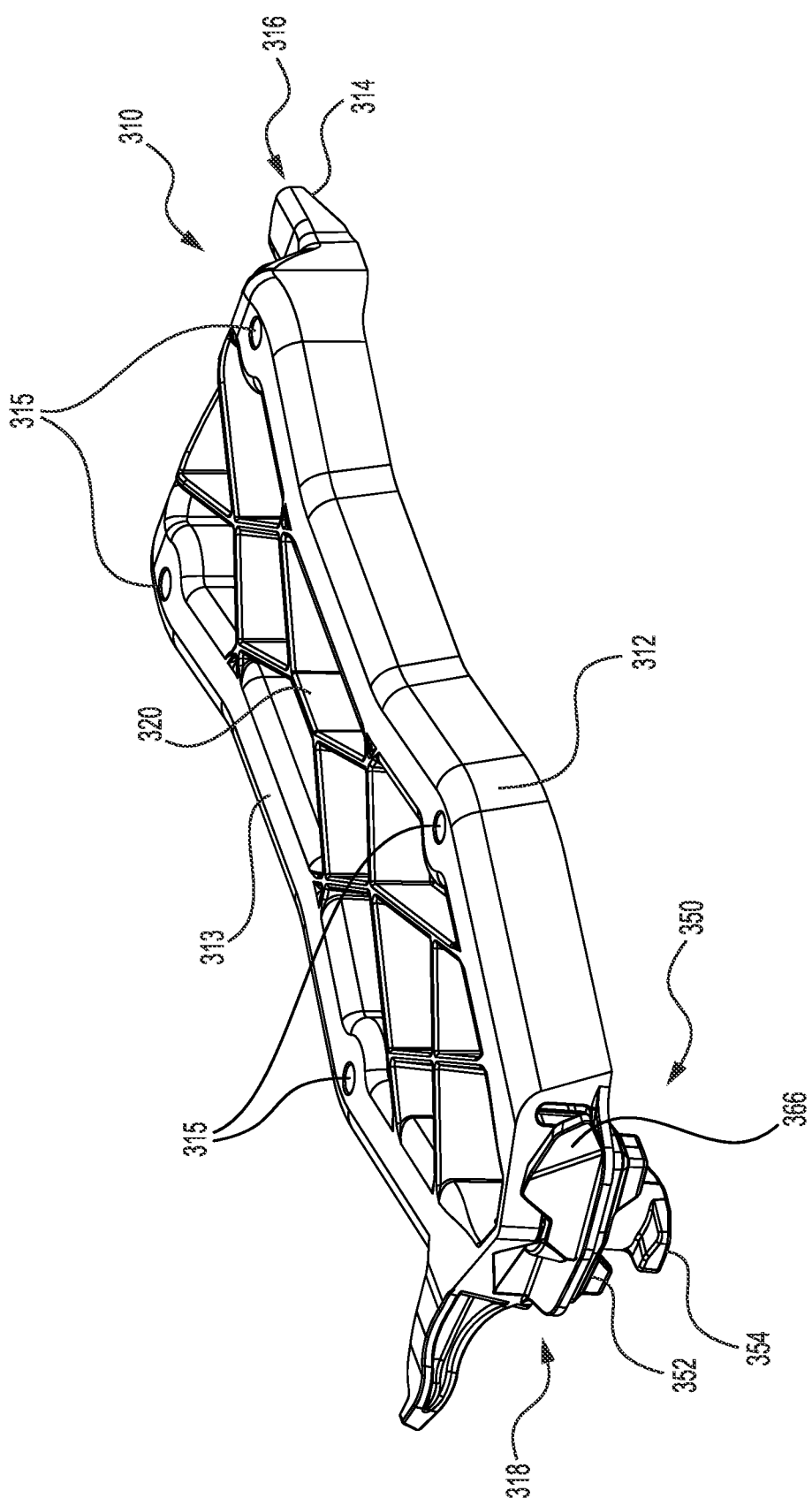
FIG. 17 is a perspective view, taken from a top, front, right side, of an accessory base of the storage container of FIG. 15.
Figure 18:
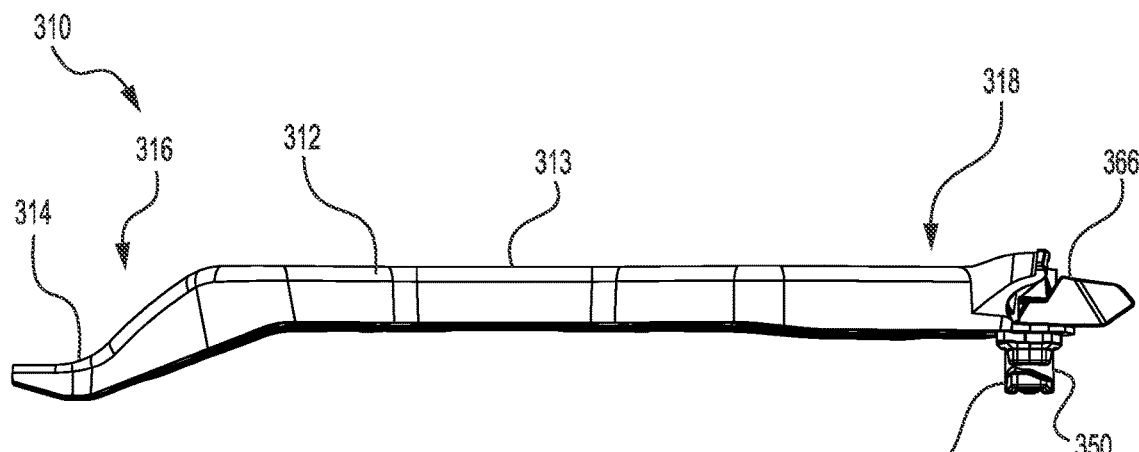
FIG. 18 is a rear elevation view of the accessory base of FIG. 17, showing an anchor lock thereof in an unlocked position.
Figure 19:
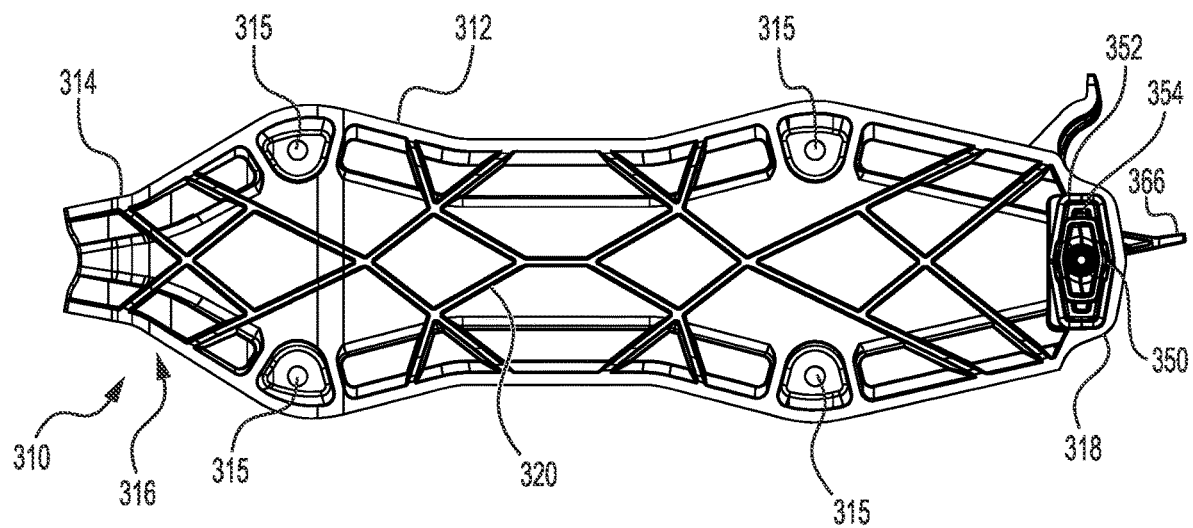
FIG. 19 is a bottom plan view of the accessory base of FIG. 17, showing the anchor lock thereof in the unlocked position.
Figure 20:
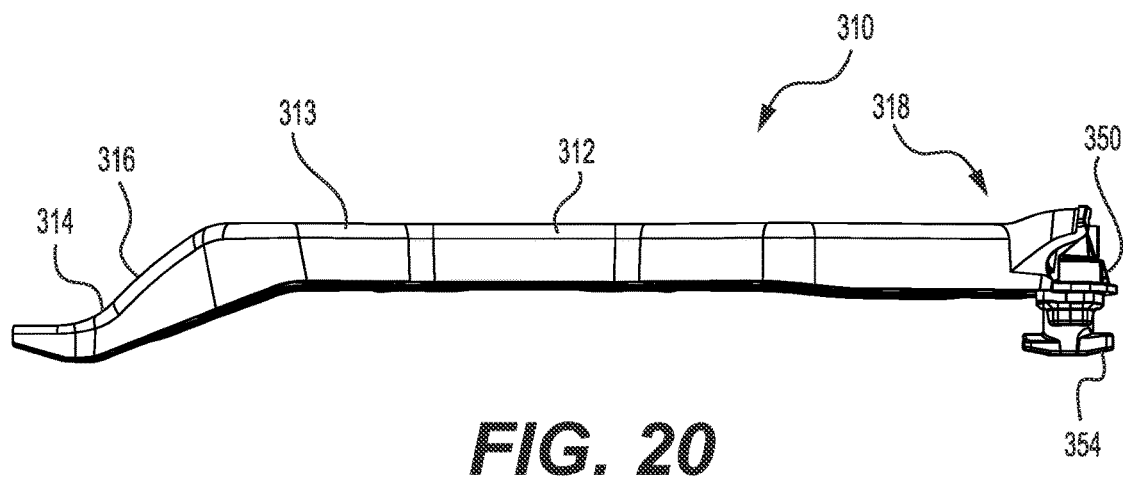
FIG. 20 is a rear elevation view of the accessory base of FIG. 17, showing the anchor lock thereof in a locked position.
Figure 21:
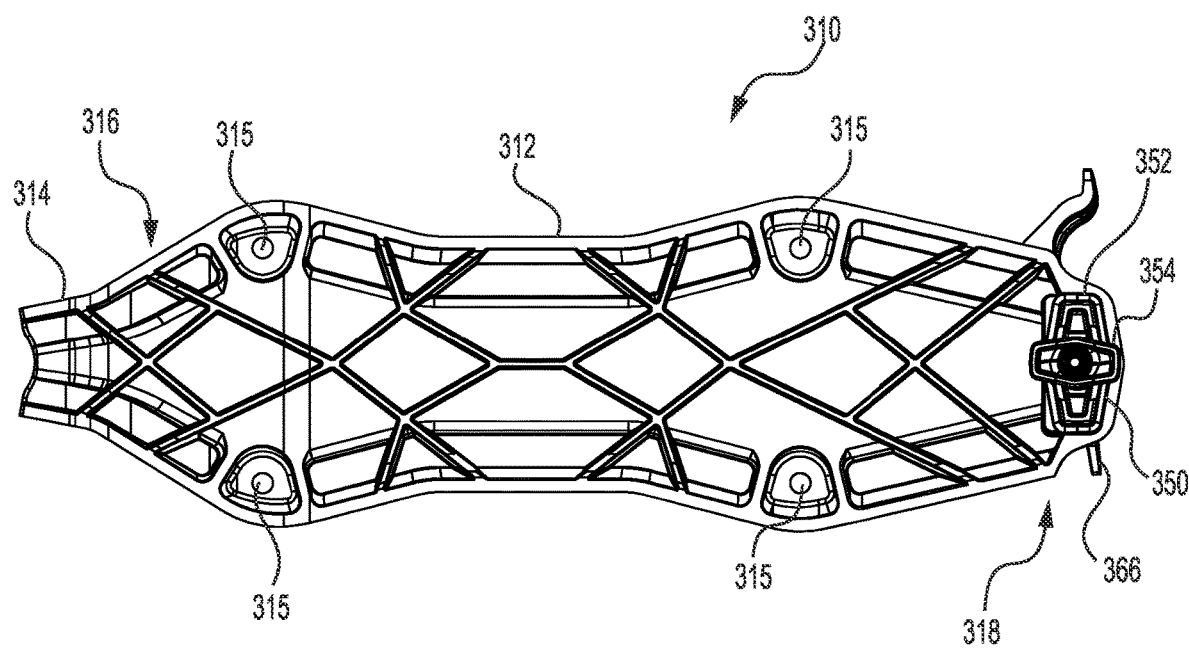
FIG. 21 is a bottom plan view of the accessory base of FIG. 17, showing the anchor lock thereof in the locked position.

With reference now to FIGS. 15 and 16, the storage container 300 also has an accessory base 310 configured to removably connect the storage container 300 to the snowmobile 10. In particular, the accessory base 310 is connected to a bottom surface 303 (FIG. 16) of the container body 302 via four fasteners 311 (two of which are shown in FIG. 15). It is contemplated that, in other embodiments, the accessory base 310 could be made integrally with the container body 302. As shown in FIGS. 17 to 21, the accessory base 310 includes a frame 312 having opposite ends 316, 318. The frame 312 has a plurality of ribs 320 disposed between the first and second ends 316, 318 for reinforcing the accessory base 310. An upper surface 313 of the frame 312 defines fastener holes 315 configured to receive the fasteners 311. In this embodiment, the accessory base 310 has two connecting features 314, 350 for removably connecting the storage container 300 to the snowmobile 10. In particular, the connecting feature 314 is a tongue fastener disposed at the first end 316 of the frame 312, while the connecting feature 350 is an anchor disposed at the second end 318 of the frame 312. As will be explained in more detail below, the tongue fastener 314 and the anchor 350 are configured to engage the anchor fixtures 110 of the connection base 100 to removably connect the storage container 300 to the connection base 100. A more complete description of the accessory base 310 can be found in U.S. Pat. No. 9,751,592. The anchor 350 is configured in the same manner as the anchors 250 of the seat 200 described above. Notably, as shown in FIG. 17, the anchor 350 has an anchor base 352, an anchor lock 354 and a lever 366 for actuation of the anchor lock 354 in order to actuate the anchor lock 354 from an unlocked position (FIGS. 18, 19) to a locked position (FIGS. 17, 20 and 21). The anchor 350 will therefore not be described in detail herein as the reader may refer back to the description of the anchors 250 of the seat 200 to understand the functioning of the anchor 350.

With reference to FIG. 15, in order to connect the storage container 300 to the connection base 100, the storage container 300 is oriented in an inclined position with the tongue fastener 314 facing downward. The tongue fastener 314 is then inserted into the fastener aperture 240 of one of the anchor fixtures 110 of the connection base 100, namely the left anchor fixture 110 in this embodiment. The storage container 300 is then tilted down to insert the anchor lock 354 of the anchor 350 (in its unlocked position) into the anchor aperture 230 of the right anchor fixture 110. As the anchor fixtures 110 are identical to one another, the tongue fastener 314 could instead be inserted into the right anchor fixture 110 and the anchor lock 354 into the left anchor fixture 110. With the anchor lock 354 received in the anchor chamber 232 of the left anchor fixture 110, the anchor lever 366 is pivoted to actuate the anchor lock 354 into the locked position. At this point, illustrated in FIG. 16, the storage container 300 is secured to the connection base 100. In order to remove the storage container 300 from the connection base 100, the anchor lock 354 is pivoted to the unlocked position and is removed from the anchor chamber 232 of the right anchor fixture 110 through the anchor aperture 230 thereof. The tongue fastener 314 is then slid out of the anchor chamber 232 of the left anchor fixture 110 through the fastener aperture 240.

Returning now to FIGS. 1 to 4, the storage container 300 can also alternatively be connected to the snowmobile 10 at a location L2 on the snowmobile 10. For instance, when the seat 200 is disposed at the location L1 on the connection base 100, the storage container 300 can be connected to the snowmobile 10 at the location L2. As such, the snowmobile 10 can be equipped with both the seat 200 and the storage container 300 at the same time, allowing the user to equip both rather than being forced to choose only one of the seat 200 and the storage container 300 to equip on the snowmobile 10. In this embodiment, the location L2 is longitudinally rearward of the location L1 and thus the locations L1, L2 may be referred to as a front location L1 and a rear location L2 respectively. The rear location L2 is on the tunnel 20 behind the location L1 and vertically lower than the front location L1.

In order to provide for connection of the storage container 300 at the rear location L2, two connecting features 410 are provided at the rear location L2. Notably, in this embodiment, the two connecting features 410 are left and right anchor fixtures which are connected to the tunnel 20. In particular, the left and right anchor fixtures 410 are disposed on the upper surface 25 of the tunnel 20, laterally spaced from one another and on opposite sides of the longitudinal centerplane 13. The left and right anchor fixtures 410 are longitudinally aligned with one another. The anchor fixtures 410 are identical to the anchor fixtures 110 of the connection base 100. For instance, each of the anchor fixtures 410 defines an anchor aperture 430 and a fastener aperture 440. The anchor fixtures 410 will therefore not be described in detail herein as the reader may refer to the description of the anchor fixtures 110. The storage container 300 is therefore removably connected at the rear location L2 in the same manner as described above with regard to connecting the storage container 300 at the front location L1. More specifically, the tongue fastener 314 is inserted into the fastener aperture 440 of one the anchor fixtures 410 while the anchor lock 354 is then inserted into the anchor aperture 430 of the opposite anchor fixture 410. The anchor lock 354 is then actuated to the locked position to secure the storage container 300 at the rear location L2. When the storage container 300 is disposed at the rear location L2, the storage container 300 is positioned vertically lower than the front location L1. For instance, the tongue fastener 314 and the anchor 350 are positioned vertically lower than the upper portion 102 of the connection base 100.

It is contemplated that, in some embodiments, rather than the seat 200 being disposed at the front location L1, another storage container having a similar configuration as the storage container 300 could be connected to the snowmobile 10 at the front location L1. As such, the snowmobile 10 could be equipped with one storage container at the front location L1 and the storage container 300 at the rear location L2, thereby allowing the snowmobile 10 to carry more cargo (e.g., fuel, or items to be stored to be stored in the storage containers).

Figure 22:
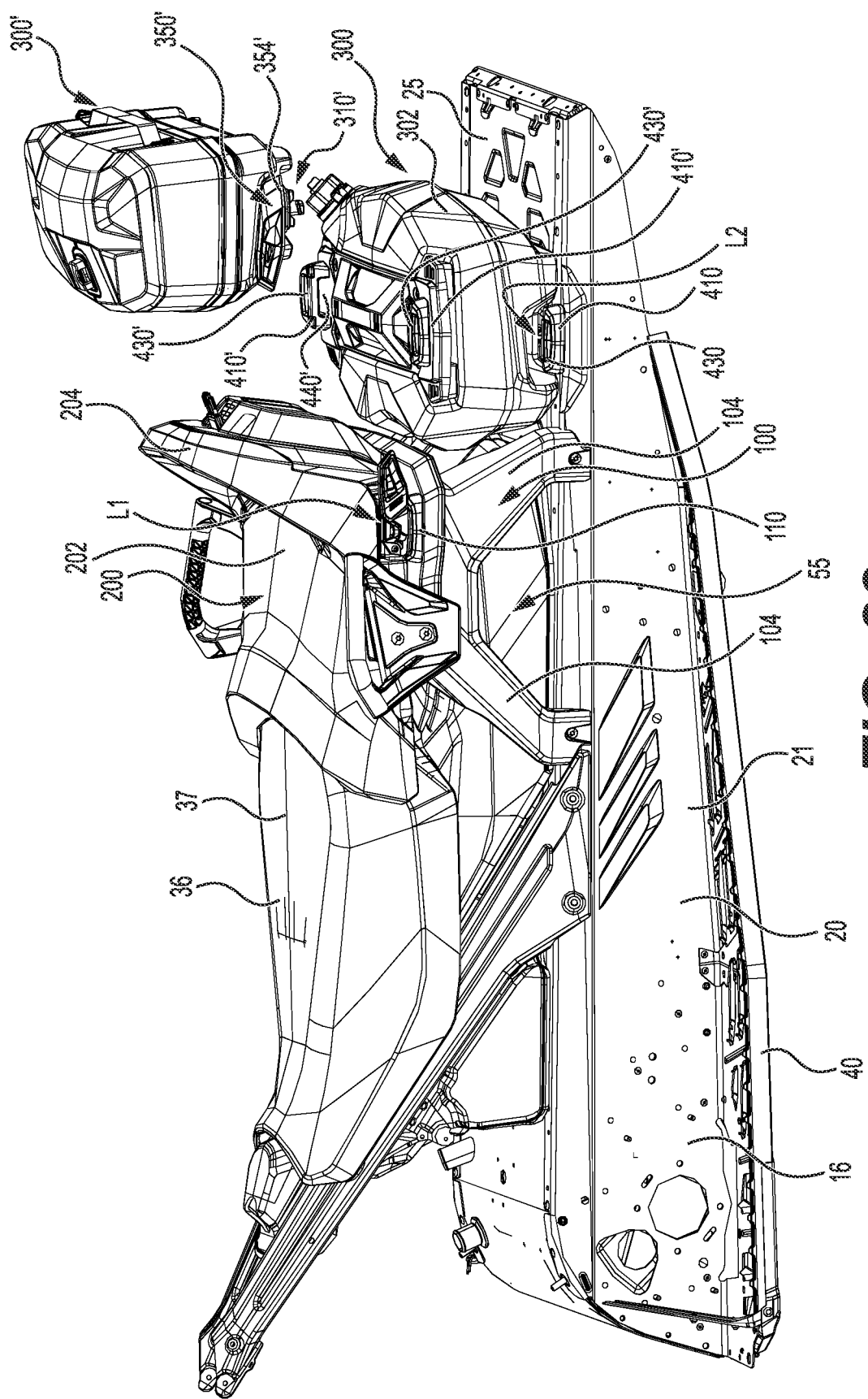
FIG. 22 is a perspective view, taken from a top, rear, left side, of part of the snowmobile of FIG. 2, showing an additional storage container of the accessory connection system disconnected from the snowmobile.
Figure 23:
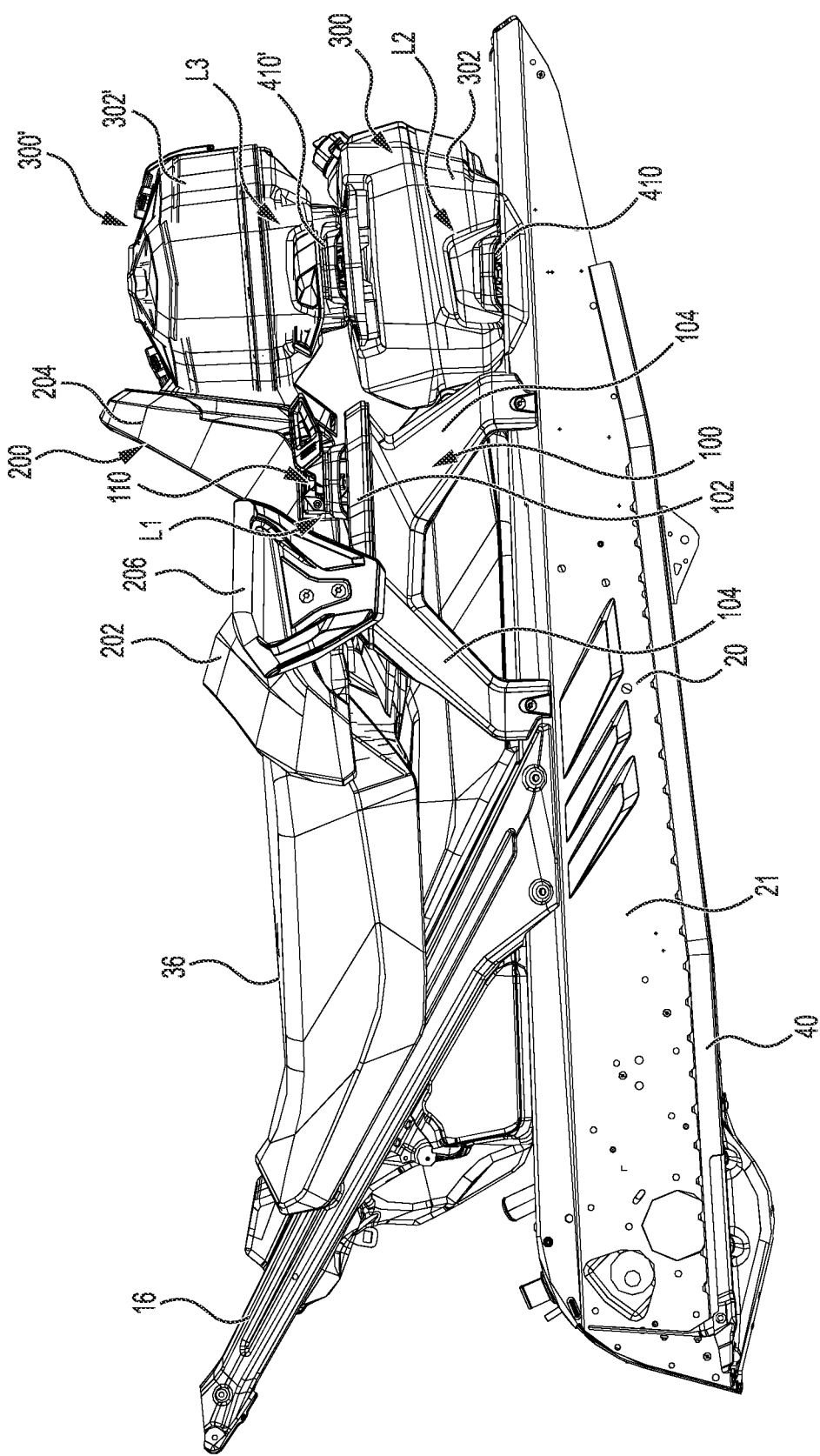
FIG. 23 is a left side elevation view of the part of the snowmobile of FIG. 22, showing the additional storage container connected to the snowmobile.

With reference to FIGS. 22 and 23, in some embodiments, an additional accessory 300' is removably connected at another rear location L3 (FIG. 23) longitudinally aligned with the rear location L2 and disposed vertically above the rear location L2. More specifically, the additional accessory 300' is stacked atop the storage container 300 and removably connected thereto. In this embodiment, the accessory 300' is another storage container. Unlike the storage container 300 described above, the storage container 300' is not a fuel container but rather a container for storing items therein. Nevertheless, the storage container 300' could be another fuel container in other embodiments. The storage container 300' has an accessory base 310' that is identical to the accessory base 310 of the storage container 300. For instance, the accessory base 310' has a tongue fastener (not shown) identical to the tongue fastener 314 as well as an anchor 350', including an anchor lock 354', identical to the anchor 350. The accessory base 310' will therefore not be described in detail herein as the reader can refer to the description of the accessory base 310.

As shown in FIG. 22, the storage container 300 at the rear location L2 has left and right anchor fixtures 410' connected to an upper surface of the container body 302. The left and right anchor fixtures 410' are identical to the anchor fixtures 410. For instance, each anchor fixture 410' has an anchor aperture 430' and a tongue aperture 440'. The anchor fixtures 410' will therefore not be described in detail herein as the reader may refer to the description of the anchor fixtures 41. As can be seen, the left and right anchor fixtures 410' are located near the left and right ends 304, 306 of the container body 302. The storage container 300' is removably connected at the rear location L3 via engagement between the accessory base 310' and the anchor fixtures 410'. Notably, the accessory base 310' engages the anchor fixtures 410' in the same manner that the accessory base 310 of the storage container 300 engages the anchor fixtures 410. In particular, as shown in FIG. 22, the tongue fastener of the accessory base 310' is inserted into one of the anchor fixtures 410' through the fastener aperture 440' thereof while the anchor lock 354' is inserted into the opposite anchor fixture 410' through the anchor aperture 430' thereof. The anchor lock 354' is then actuated into the locked position to secure the storage container 300' in place atop the storage container 300 as shown in FIG. 23.

Figure 24:
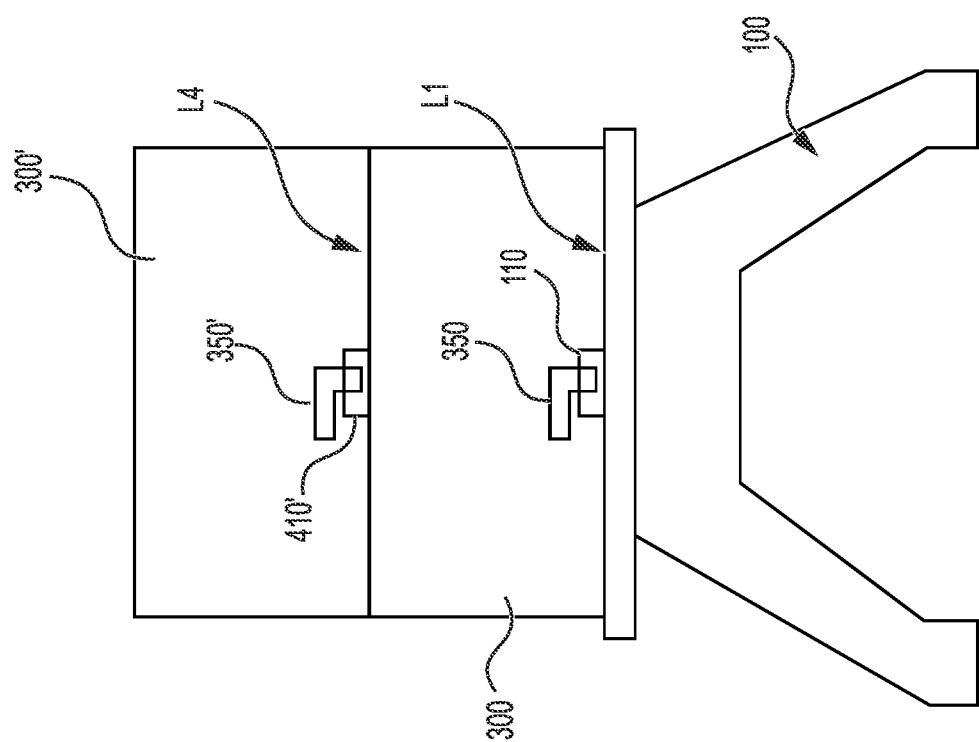
FIG. 24 is a schematic representation of another arrangement of the additional storage container connected to the snowmobile.

As will be appreciated from the above, the anchor fixtures 110 of the connection base 100, the anchor fixtures 410 connected to the tunnel 20, and the anchor fixtures 410' connected to the upper surface of the storage container 300 are identical to one another. This allows significant flexibility in the positioning of the storage containers 300, 300'. For instance, with reference to FIG. 24, in an alternative arrangement in which the seat 200 is not connected to the snowmobile 10, the storage containers 300, 300' are stacked atop the connection base 100. That is, the storage container 300 is connected to the connection base 100 at the front location L1 via their respective connecting features, while the storage container 300' is connected to the storage container 300 via their respective connecting features as described above with respect to FIGS. 22 and 23. As such, the storage container 300' is disposed at another front location L4 disposed above the front location L1.

It is contemplated that a kit including the connection base 100, the seat 200 and the storage container 300, and optionally the storage container 300', could be distributed as an after-market product for users to purchase and install themselves. In some cases, the kit may also include the anchor fixtures 410.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A seat and accessory connection system for a vehicle, comprising:
 a connection base configured to be connected to the vehicle at a first location on the vehicle;
 a seat configured to be removably connected to the connection base such that the seat is disposed behind a driver seat of the vehicle, the seat comprising at least one first connecting feature; and
 an accessory configured to be removably and selectively connected to either one of:
   the connection base at the first location on the vehicle, and
   the vehicle at a second location on the vehicle,
 the accessory comprising at least one second connecting feature for removably connecting the accessory to the first location and the second location,
 the connection base having at least one third connecting feature configured to selectively engage the at least one first connecting feature of the seat and the at least one second connecting feature of the accessory to removably connect the seat or the accessory.

2. The seat and accessory connection system of claim 1, further comprising:
 at least one fourth connecting feature configured to be connected to the vehicle at the second location on the vehicle, the at least one fourth connecting feature being configured to engage the at least one second connecting feature of the accessory to removably connect the accessory at the second location on the vehicle.

3. The seat and accessory connection system of claim 1, wherein:
 the at least one first connecting feature of the seat comprises:
   a first seat anchor; and
   a second seat anchor spaced apart from the first seat anchor;
 the at least one second connecting feature of the accessory comprises:
   an accessory anchor; and
   an accessory tongue spaced apart from the accessory anchor;
 and
 the at least one third connecting feature of the connection base comprises:
   a first anchor fixture configured to selectively receive the first seat anchor and the accessory anchor; and
   a second anchor fixture configured to selectively receive the second seat anchor and the accessory tongue.

4. The seat and accessory connection system of claim 3, wherein each of the first seat anchor, the second seat anchor and the accessory anchor is actuatable for selective locking thereof to a corresponding one of the first and second anchor fixtures.

5. The seat and accessory connection system of claim 4, wherein each of the first seat anchor, the second seat anchor and the accessory anchor has a rotatable lever for selective locking thereof to the corresponding one of the first and second anchor fixtures.

6. The seat and accessory connection system of claim 1, wherein the connection base comprises:
 an upper portion comprising the at least one third connecting feature;
 a left leg and a right leg extending downward from the upper portion, the left leg and the right leg being laterally spaced apart from one another, the left leg and the right leg being configured to be connected to the vehicle; and
 each of the left leg and the right leg has an upper end portion and a lower end portion, the lower end portion being configured to be connected to the vehicle.

7. The seat and accessory connection system of claim 6, wherein the upper portion comprises a platform, the at least one third connecting feature being connected to the platform.

8. The seat and accessory connection system of claim 6, wherein:
 the left leg is a front left leg;
 the right leg is a front right leg; and
 the connection base further comprises a rear left leg and a rear right leg extending downward from the upper portion, the rear left leg and the rear right leg being configured to be connected to the vehicle.

9. The seat and accessory connection system of claim 6, wherein:
 the seat comprises at least one hook extending from a bottom surface of the seat; and
 the upper portion defines at least one slot configured to receive the at least one hook.

10. The seat and accessory connection system of claim 1, wherein:
 the seat is a passenger seat; and
 the accessory is a storage container.

11. A vehicle comprising:
 a frame;
 a driver seat supported by the frame;

a plurality of ground-engaging members operatively connected to the frame;

a motor operatively connected to at least one of the ground-engaging members to drive the vehicle; and a seat and accessory connection system for a vehicle, comprising:

a connection base connected to the frame at a first location on the vehicle;

a seat having at least one first connecting feature, the seat removably connected to the connection base via the at least one first connecting feature such that the seat is disposed behind the driver seat;

an accessory having at least one second connecting feature, the accessory removably connected to the vehicle at a second location on the vehicle via the at least one second connecting feature, and the connection base having at least one third connecting feature engaged with the at least one first connecting feature, the at least one third connecting feature being further configured to selectively engage the at least one second connecting feature of the accessory to removably connect the accessory instead of the seat.

12. The vehicle of claim 11, wherein the seat and accessory connection system further comprises at least one fourth connecting feature connected to the frame, the at least one fourth connecting feature engaging the at least one second connecting feature of the accessory to removably connect the accessory at the second location on the vehicle.

13. The vehicle of claim 11, wherein:
the first location is behind the driver seat; and
the seat is a rear passenger seat.

14. The vehicle of claim 13, wherein the second location is behind the first location.

15. The vehicle of claim 11, further comprising:
a power storage compartment for powering the motor; and
the connection base is connected to the frame such that at least part of the connection base extends vertically above the power storage compartment.

16. The vehicle of claim 15, wherein the connection base comprises:

an upper portion comprising the at least one third connecting feature; and a left leg and a right leg extending downward from the upper portion, the left leg and the right leg being laterally spaced apart from one another, the left leg and the right leg being connected to the frame, the left leg and the right leg straddling the power storage compartment such that the upper portion extends vertically above the power storage compartment.

17. The vehicle of claim 16, wherein:
the driver seat has an upper surface for seating a driver of the vehicle; and
the upper portion of the connection base is disposed vertically lower than the upper surface of the driver seat.

18. The vehicle of claim 16, wherein the at least one second connecting feature of the accessory is positioned vertically lower than the upper portion of the connection base.

19. The vehicle of claim 15, wherein the motor is an internal combustion engine and the power storage compartment comprises a fuel tank.

20. The vehicle of claim 11, wherein:
the vehicle is a snowmobile;
the frame comprises a tunnel; and
the connection base is connected to the tunnel.

* * * * *